United States Patent [19]
Ohno et al.

[11] Patent Number: 4,803,634
[45] Date of Patent: Feb. 7, 1989

[54] PRODUCTION PROCESS CONTROL SYSTEM IN NEWSPAPER PRINTING

[75] Inventors: Kinichiro Ohno, Tokyo; Tomoshi Kawata, Yokohama, both of Japan

[73] Assignee: Tokyo Kikai Seisakuchi, Ltd., Japan

[21] Appl. No.: 907,305

[22] Filed: Sep. 12, 1986

[30] Foreign Application Priority Data

Sep. 12, 1985 [JP] Japan ............................ 60-202383

[51] Int. Cl.$^4$ ............................................ G06F 15/46
[52] U.S. Cl. .................................. 364/478; 364/131; 364/138; 364/403; 364/471
[58] Field of Search ............... 364/478, 471, 469, 131, 364/132, 133, 138, 523, 403

[56] References Cited

U.S. PATENT DOCUMENTS

| 4,151,590 | 4/1979 | Azegami | 364/200 |
| 4,304,001 | 12/1981 | Cope | 364/132 X |
| 4,346,446 | 8/1982 | Erbstein et al. | 364/469 |
| 4,472,783 | 9/1984 | Johnstone et al. | 364/132 X |
| 4,495,582 | 1/1985 | Dessert et al. | 364/469 |

FOREIGN PATENT DOCUMENTS 0006958 1/1982 Japan .................................. 364/132

Primary Examiner—Allen MacDonald
Attorney, Agent, or Firm—McGlew and Tuttle

[57] ABSTRACT

A production process control system for a news printing system using rotary presses comprising a press control subsystem, a sorting and delivery control subsystem, at least any one of a printing plate transportation control subsystem, a newsprint roll storage control subsystem, a mailroom materials supply control supply control subsystem and a truck yard bundle sorting control subsystem, and a production process control system for supervising and controlling each of said control subsystems. The stations provided in the production process control system and the control subsystems are linked with each other via a ring-like data highway network. Each of the stations are equipped with a processor or an intelligent input/output control unit, so that each of the production process control systems and the control subsystems can execute necessary data processing while communicating with each other. The production process control system can supervise and control the processing carried out by each of said other control subsystems. In addition, a circulation control subsystem relating to newspaper sales business processing is connected with the production process control system via a circuit separated from the data highway network.

7 Claims, 35 Drawing Sheets

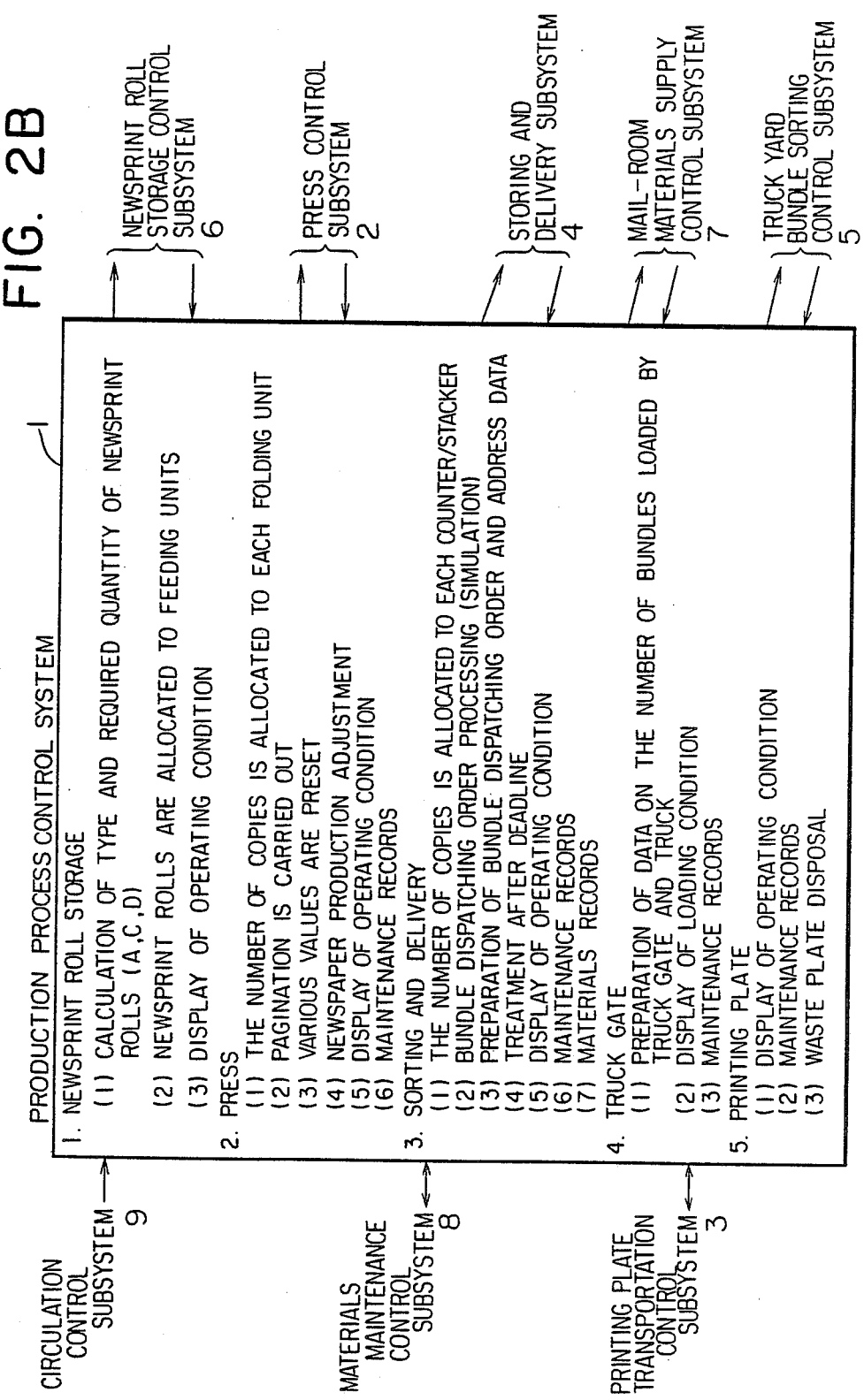

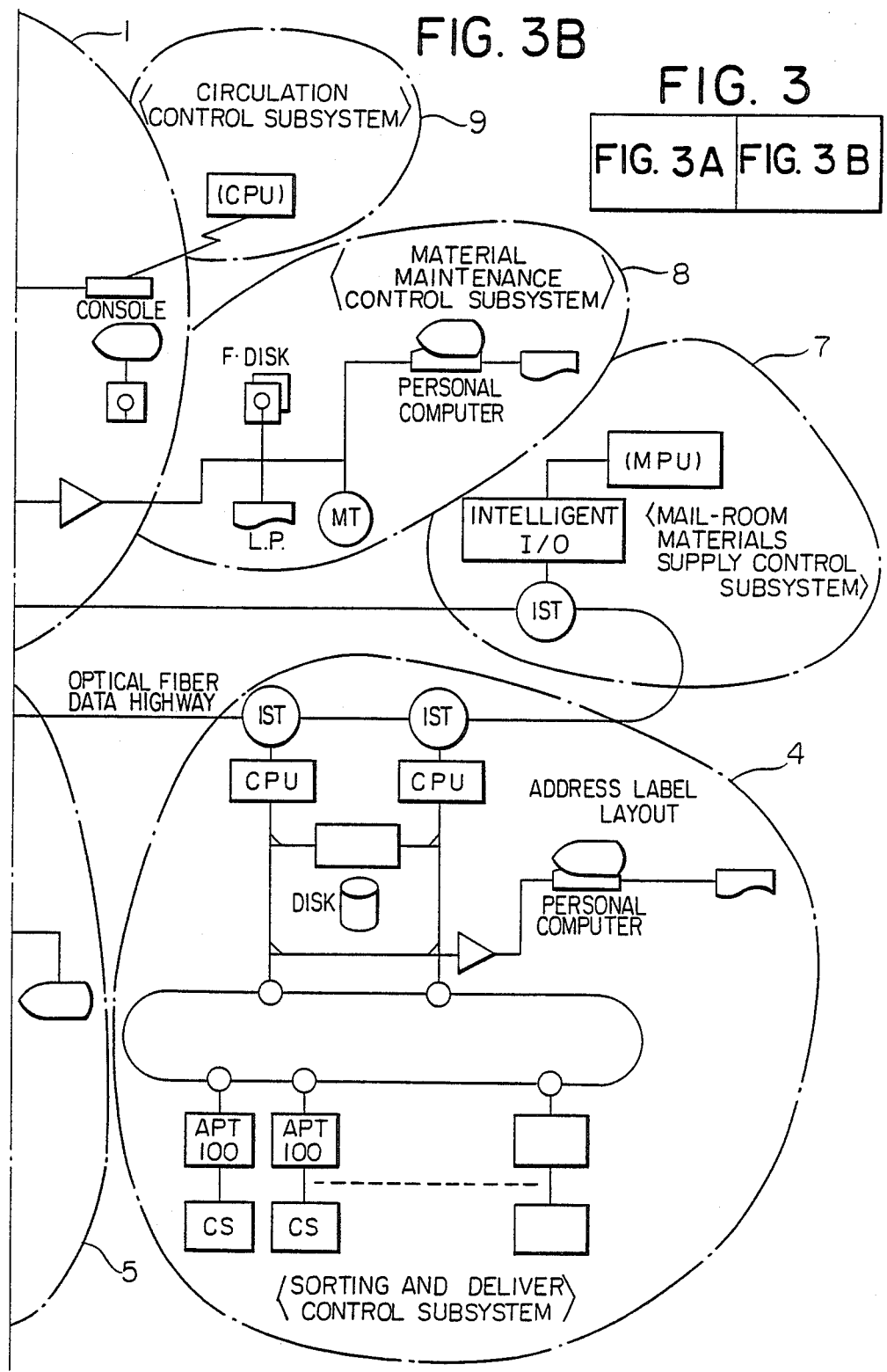

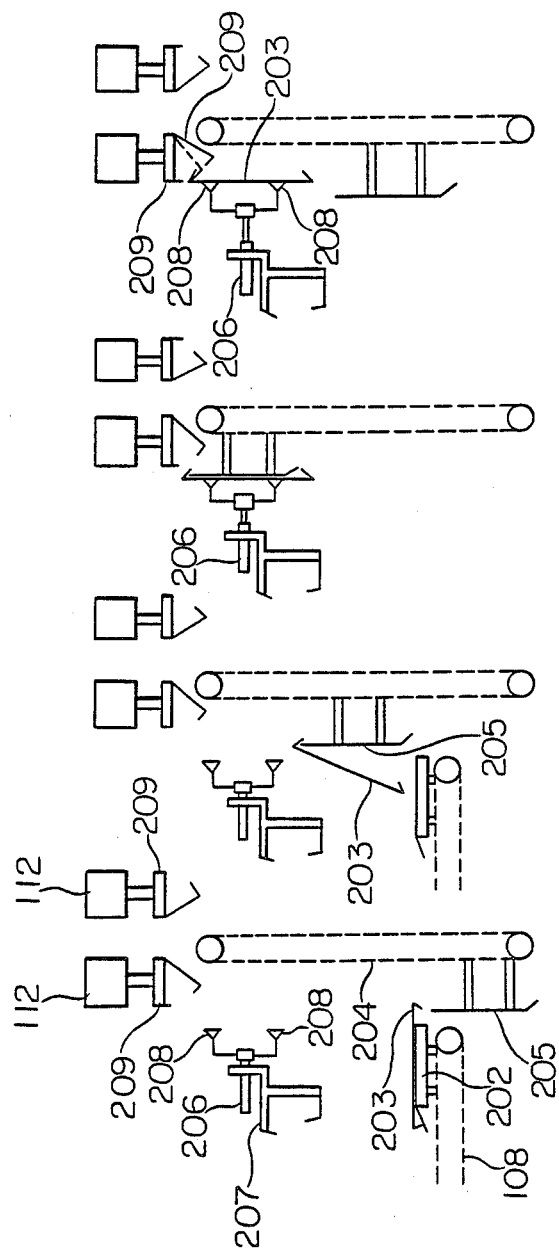

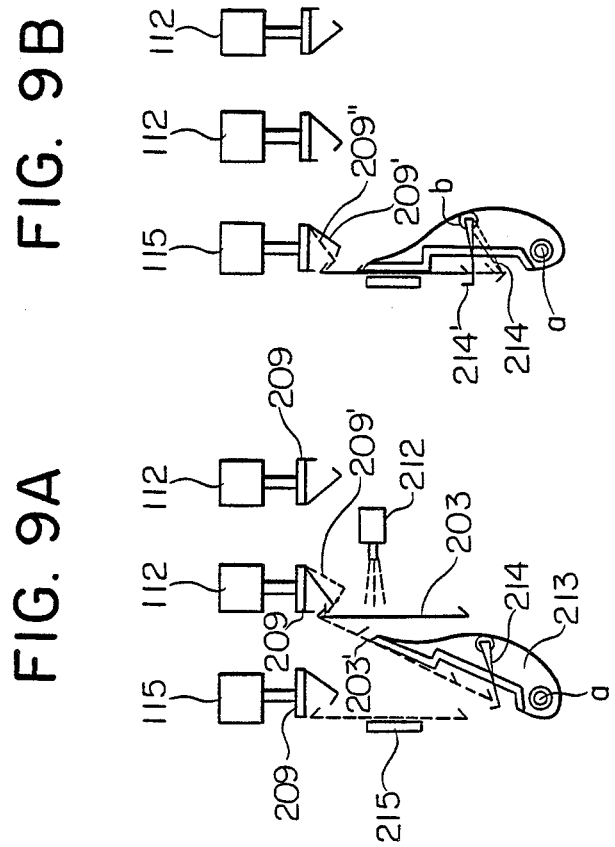

FIG. 12

PRINTING PLATE LAYOUT DATA FILE

| EDITION NO. | PRESS NO. | CYLINDER NO. | SURFACE | PAGE NO. | COLOR | NO. OF PLATE PROCESSED |
|---|---|---|---|---|---|---|
| NO. 1 EDITION | $P_1$ | NO. 1 CYLINDER | A | 1 | | 2 |
| | | | B | 22 | | 2 |
| | | | C | 3 | | 2 |
| | | | D | 20 | | 2 |
| | | NO. 2 CYLINDER | F | 2 | | 2 |
| | | | G | 21 | | 2 |
| | | | H | 4 | | 2 |
| | | | I | 19 | | 2 |
| | $P_2$ | NO. 1 CYLINDER | A | 18 | | 2 |
| | | | B | 5 | | 2 |
| | | | C | 16 | | 2 |
| | | | D | 7 | | 2 |
| | | NO. 2 CYLINDER | E | 18 | | 2 |
| | | | F | 5 | | 2 |
| | | | G | 16 | | 2 |
| | | | H | 7 | | 2 |
| | $P_3$ | NO. 1 CYLINDER | A | 18 | | 2 |
| | | | B | 5 | | 2 |
| | | | C | 16 | | 2 |
| | | | D | 7 | | 2 |

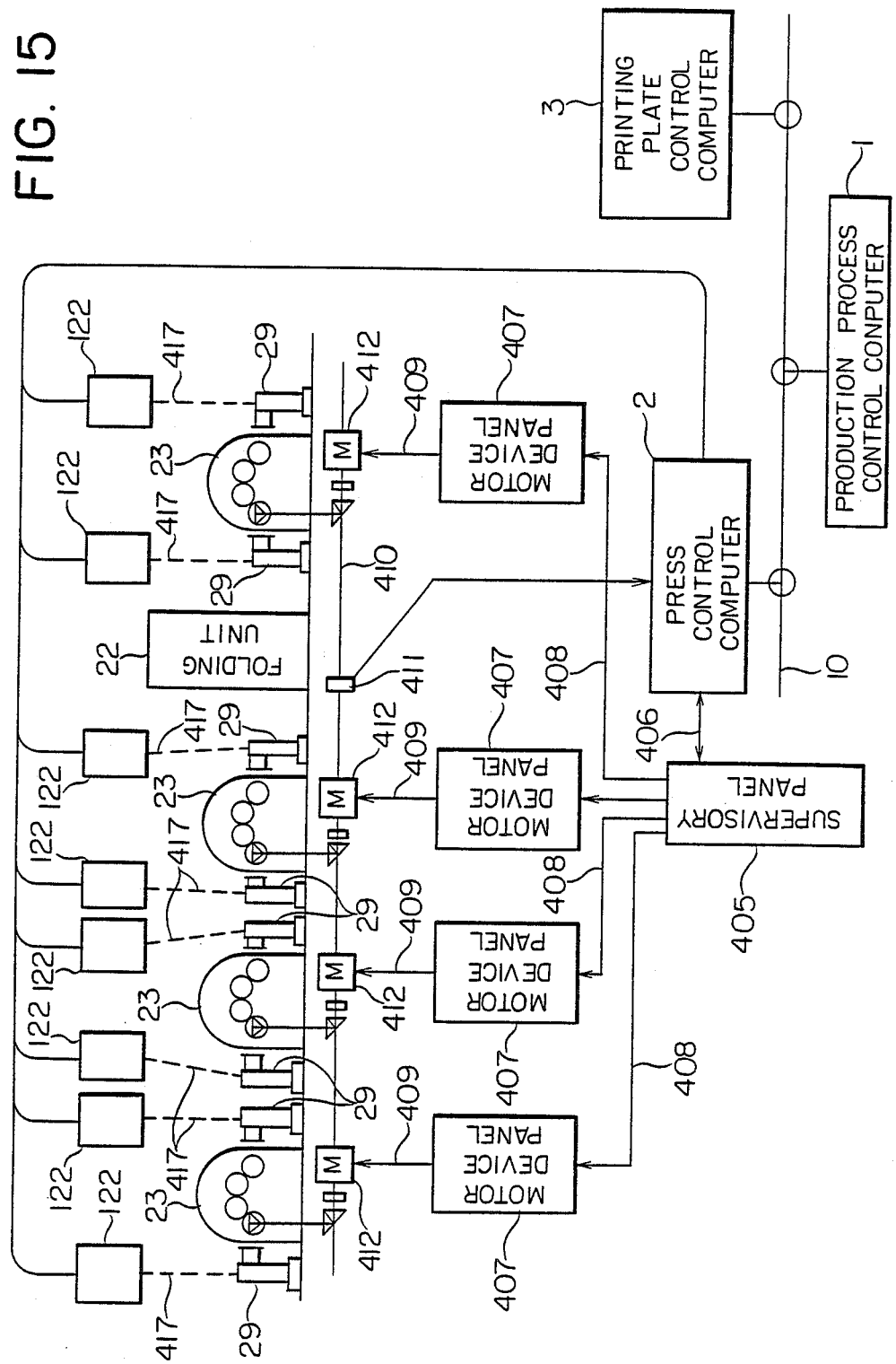

FIG. 16

PRINTING PLATE PAGINATION DATA FILE

| PRINTING EDITION | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|---|
| 0 EDITION (EVENING) | ○ | ○ | ○ | ○ | ○ | ○ | ○ | ○ | ○ | ○ | ○ | ○ | | | | | | | | | | | | | | | | |
| 1 EDITION (EVENING) | | | | | | | | | ○ | ○ | ○ | | | | | | | | | | | | | | | | | |
| 2 EDITION (EVENING) | | | | | | | | | ○ | ○ | ○ | | | | | | | | | | | | | | | | | |
| 3 EDITION (EVENING) | | | | | | | | | | ○ | ○ | | | | | | | | | | | | | | | | | |
| 7 EDITION (MORNING) | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | | | | |
| 8 EDITION (MORNING) | | | | | | | | | | | | | | | | | ○ | ○ | ○ | ○ | ○ | ○ | ○ | | | | | |
| 9 EDITION (MORNING) | | | | | | | | | | | | | | ○ | ○ | | | ○ | ○ | ○ | ○ | ○ | ○ | | | | | |
| 10 EDITION (MORNING) | ○ | | | | | | | | | | | | | | | | | ○ | | | | | | | | | | |
| 11 EDITION (MORNING) | ○ | | | | | | | | | | | | | | | | | | ○ | ○ | ○ | | | | | | | |
| 12 EDITION (MORNING) | ○ | ○ | | | | | | | | | | | | | | | | | ○ | ○ | ○ | | | | | | | |
| 13 EDITION (MORNING) | ○ | ○ | | | | | | | | | | | | | | | | | ○ | ○ | ○ | | | | | | | |
| 14 EDITION (MORNING) | | | | | | | | | | | | | | | | | | | | ○ | ○ | | | | | | | |

| SERIAL NO. | DATA ON PER-BUNDLE NO. OF COPIES | BUNDLING END FLAG | ADDRESS PRINTING DATA |
|---|---|---|---|
| 1 | 26 | 1 | |
| 2 | 55 | 1 | |
| 3 | 90 | 1 | |
| 4 | 100 | 1 | |
| 5 | 23 | 1 | |
| 6 | 75 | 1 | |
| 7 | 17 | 0 | |
| 8 | 100 | 0 | |
| 9 | 18 | 0 | |
| 10 | 95 | 0 | |
| 3850 | 100 | 0 | |

| FOLDING UNIT | COUNTER/ STACKER | ADDRESS LABEL PRINTING/ TAGGING DEVICE | SINGLE DELIVERY FLAG |
|---|---|---|---|
| $F_1$ | $CS_1, CS_2$ | $APT_1, APT_2$ | 1 |
| $F_2$ | $CS_3, CS_4$ | $APT_3, APT_4$ | 1 |
| $F_3$ | $CS_5, CS_6$ | $APT_5, APT_6$ | 1 |
| $F_4$ | $CS_7, CS_8$ | $APT_7, APT_8$ | 1 |
| $F_5$ | $CS_9, CS_{10}$ | $APT_9, APT_{10}$ | 1 |
| $F_n$ | $CS_{n-1}, CS_n$ | $APT_{n-1}, APT_n$ | 1 |

FIG. 26A

PARTS FILE    DATE: SEPTEMBER 1, 1960    2210

| PRESS NO. | LOCATION | PART NAME | PART CODE | OPERATION FREQUENCY /DAY | UNIT HOUR FREQUENCY | UNIT FREQUENCY | UNIT NO. OF COPIES |
|---|---|---|---|---|---|---|---|
| F1 | NO. 1 FEEDING UNIT | PASTER BRUSH | K-00001 | 15 | | 1 | 1 |
| | | BELT ARM SAFETY PIN | K-00002 | 150,000 | | 1 | 1 |
| | | LIFTER BRAKE | K-00003 | 150 | | 1 | |
| | | SPIDER CHUCK | K-00004 | 15 | | 1 | |
| | | OIL | K-00006 | 6 | 1 | | |
| | | OIL DAMPER | K-00007 | 6 | 1 | | |
| | NO. 1 FOLDING UNIT | ROLL-TOP-OF-FORMER TROLLEY | F-00001 | 150,000 | | | 1 |
| | | SLITTER KNIFE | F-00002 | 150,000 | | | 1 |
| | | CUTTING KNIFE | F-00003 | 150,000 | | | 1 |
| | | CUTTING RUBBER | F-00004 | 150,000 | | | 1 |
| | | FOLDING PIN | F-00005 | 150,000 | | | 1 |
| | NO. 1 PRINTING UNIT | BLANKET | U-00001 | 150,000 | | | 1 |
| | | INK FORM ROLLER | U-00002 | 150,000 | | | 1 |
| | | INK DISTRIBUTOR ROLLER | U-00003 | 150,000 | | | 1 |
| | | BRUSH | U-00004 | 500 | | 1 | |

| FIG.26 A | FIG.26 B |

| LIFE EXPECTANCY | CUMULATIVE FREQUENCY | RESIDUAL LIFE | SCHEDULED REPLACEMENT DATE | DATE OF PREVIOUS REPLACEMENT | INSPECTION FREQUENCY (TIMES/YEAR) | DATE OF PREVIOUS INSPECTION | DATE OF NEXT INSPECTION |
|---|---|---|---|---|---|---|---|
| 10,00 | 325 | 675 | 60.10.15 | 60.5.1 | 12 | 60.10.1 | 60.11.1 |
| 26,500,000 | 16,500,000 | 10,000,000 | 60.11.6 | 60.5.10 | 4 | | |
| 50,000 | 2,000 | 48,000 | 60.10.29 | 60.1.10 | 4 | | |
| 6,000 | 6,000 | 0 | 60.9.1 | 59.7.25 | 8 | | |
| 2,000 | 800 | 1,200 | | | 12 | | |
| 4,000 | 3,000 | 1,000 | | | 10 | | |
| 4,500,000 | 3,000,000 | 1,500,000 | | | 4 | | |
| 27,000,000 | 30,000 | 26,700,000 | | | 6 | | |
| 4,500,000 | 1,500,000 | 3,000,000 | | | 12 | | |
| 4,500,000 | 2,500,000 | 2,000,000 | | | 12 | | |
| 4,500,000 | 1,000,000 | 3,500,000 | | | 12 | | |
| 4,500,000 | 300,000 | 4,200,000 | | | 12 | | |
| 9,000,000 | 7,000,000 | 2,100,000 | | | 10 | | |
| 9,000,000 | 8,000,000 | 1,000,000 | | | 10 | | |
| 1,000,000 | 100,000 | 900,000 | | | 4 | | |

PARTS INVENTORY FILE 2220

| PART CODE | PART NAME | SPECIFICATION | MANUFACTURER | QUANTITY IN STOCK | POINT OF PLACING ORDERS | DATE OF ORDER |
|---|---|---|---|---|---|---|
| K-00001 | | | | 4 | 4 | 60.9.1 |
| K-00002 | | | | 30 | 7 | |
| K-00003 | | | | 100 | 20 | |
| ----- | | | | | | |
| K-xxxxx | | | | 200 | 40 | |
| F-00001 | ------ | ------ | ------ | ------ | ------ | ------ |
| F-00002 | | | | | | |
| F-00003 | | | | | | |
| ----- | | | | | | |
| F-xxxxx | | | | | | |
| U-00001 | | | | | | |
| U-00002 | | | | | | |
| U-00003 | | | | | | |
| ----- | | | | | | |
| U-xxxxx | | | | | | |

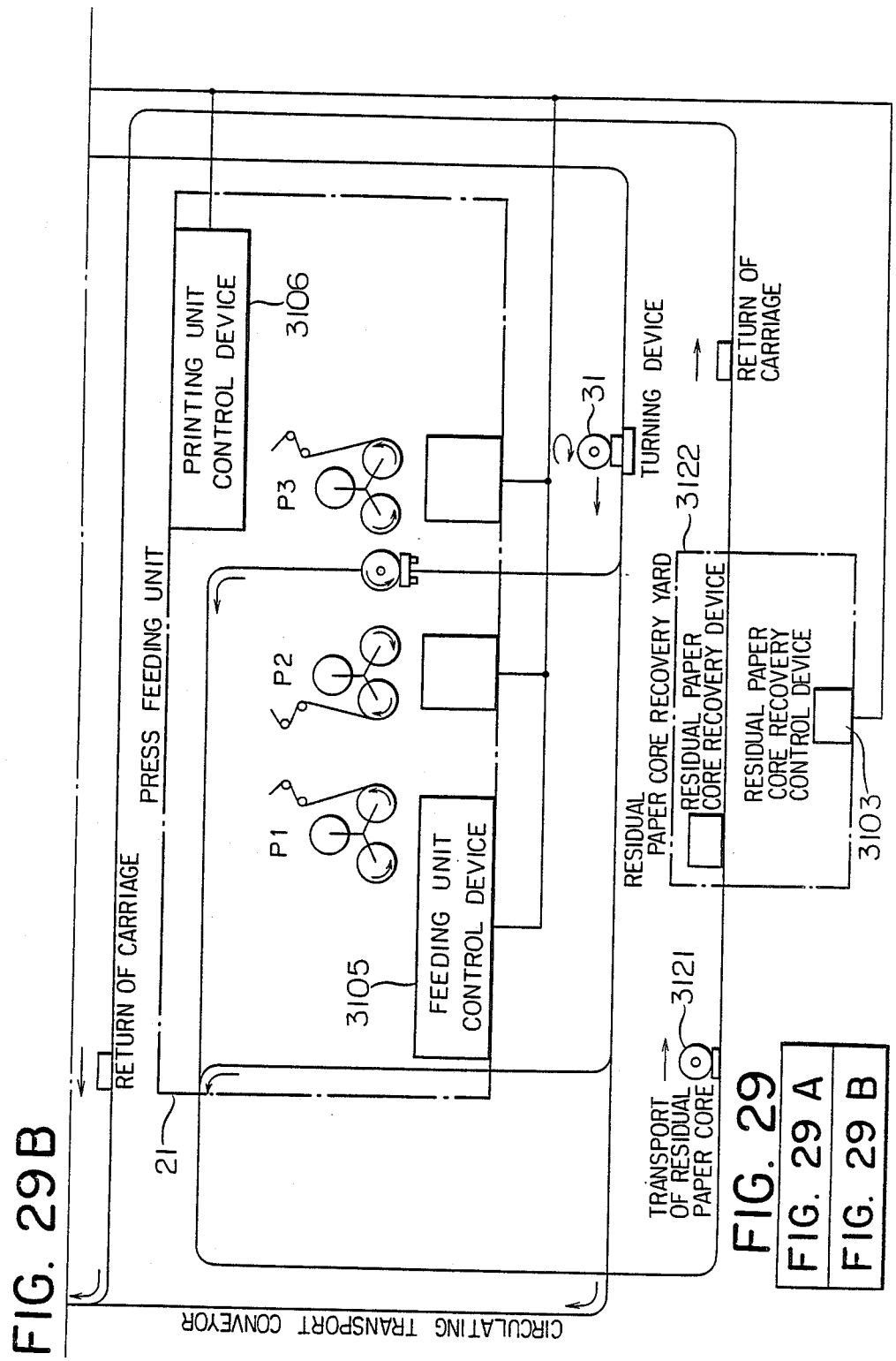

PRODUCTION PROCESS CONTROL SYSTEM IN NEWSPAPER PRINTING

BACKGROUND OF THE INVENTION

This invention relates generally to a process control system for newspaper printing, and more specifically to a process control system for newspaper printing in which a press control subsystem and other control subsystems are linked with a production process control subsystem by means of a ring-shaped data highway network so that the entire newspaper printing system is supervised and control by the process control system.

Automation of the newspaper printing system begins with the automation of individual pieces of equipment such as the paster, the counter/stacker, and then evolves into the automatic soiled copies ejector and the automatic newspaper mailing line by organically connecting these "points" with a "line" (i.e., automation achieved by connecting individual devices into a continuous process line).

The Automated Newspaper Printing and Mailing System completed in Nihon Keizai Shinbun's Osaki Plant (Chiyoda Sogyo) in 1973 is an integrated control system for totally controlling the entire processes ranging from printing to shipment by means of a computer. This system, which is also called the NPC (Newspaper Plant Computerized System) that is a technological breakthrough representing a departure from the concept limited to "points" to the concept embracing "surfaces." The concept of computer control system is now further evolving into that of a total system embracing "three-dimensional" characteristics.

Formulation of the aforementioned total control system requires a data processing system in which a group of subsystems requiring high-speed, real-time processing, such as the press control department, the printing plate transportation control subsystem, the sorting and delivery control subsystem and the truck yard bundle sorting control subsystem; a group of subsystems that permit processing at relatively low speed, such as the newsprint roll storage control subsystem and the mailroom materials supply control subsystem; a group of subsystems that permit off-line processing, such as the materials and maintenance control subsystem; a group of subsystems that involve the processing of command information, such as the circulation control sub-system; and a production process control system that supervises and controls the subsystem group requiring high-speed, real-time processing and the subsystem group that permits relatively low-speed processing perform the individual processing given to each of them by means of either of a processor or an intelligent input/output unit incorporated in each of these control subsystems.

In such a case, an important problem is how to link a plurality of press control and other control subsystems with the production process control system. Particularly, a parallel data transmission among a multitude of processors could increase the number of signal lines. A data transmission in a bit-serial fashion, on the other hand, could hamper real-time processing. Furthermore, if information is exchanged between the production process control system and a subsystem group allowing off-line processing or a subsystem group involving the processing of command information, using a transmission route in common with the information transmission between the production process control subsystem and a subsystem group requiring real-time processing, an unexpected trouble might result in the latter information transmission.

In automating the conventional system, a system concept has heretofore been employed in which the number of newspaper copies and addresses (hereinafter referred to as address labels) are prepared off-line in the circulation control subsystem; and the sorting and delivery control subsystem and the press control subsystem perform processing operations on the basis of the information contained in the address labels. In formulating a total control system, however, it is desired that the newspaper printing system can flexibly and quickly cope with day-to-day or hourly changes in the number of copies in circulation, rather than resorting to the address labels prepared off-line.

SUMMARY OF THE INVENTION

It is an object of this invention to overcome the above problems by providing a process control system for a newspaper printing system in which a press control subsystem, a printing plate transportation control subsystem and a sorting and delivery control subsystem are linked with a production process control system by means of a ring-shaped data highway network; and a circulation control system is connected to the production process control system so as to enable the production process control system to supervise and control the entire newspaper printing system.

It is another object of this invention to provide a printing plate transport mounting/demounting system which eliminates the conventional manual printing plate mounting/demounting operations by automating these operations to achieve labor saving in printing plate mounting and prevent misprinting due to the mistake in the printing plate mounting position, in which a printing plate prepared in a plate-processing machine is automatically transported to the predetermined plate mounting position in the press printing unit, and automatically mounted on the plate cylinder, or removed from the cylinder for discarding when replacing the plate with a new one, by means of an industrial robot.

It is a further object of this invention to provide a sorting and delivery processing system in which the conventional sorting and delivery system relying on address labels is improved; and the preparation of newspaper bundles and the printing and attachment of address labels on newspaper bundles are performed in accordance with the instructions given by the host computer, i.e., through on-line processing, so as to automate the printing and mailing of newspaper.

It is still a further object of this invention to provide a press maintenance control system in which the conventional press maintenance system involving a large number of consumable parts of the press and accordingly much labor for the maintenance thereof is improved; and the timing of inspection and the timing of parts replacement are calculated in advance from the cumulative total of the predicted life of consumable parts and press operation time, and displayed or printed so as to enable to place orders for parts at the predetermined timing of ordering.

It is still a further object of this invention to provide a newsprint roll supply system in which the conventional newsprint roll supply system involving the transportation of heavy newsprint rolls from the warehouse in an appropriate sequence acoordingly requiring much labor is improved; and a required number of newspring rolls are automatically supplied from the newspring roll warehouse to the feeding units of a plurality of presses on the basis of the information given by the host computer on the printing work requiring for a given day, and at the same time the receiving and discharging of newsprint rolls in the warehouse are controlled.

BRIEF DESCRIPTION OF THE DRAWING

FIGS. 3, 3A and 3B show the configuration of a system embodying the construction shown in FIG. 1. FIGS. 8A through 10C are diagrams of assistance in explaining the receiving and discharging of printing plates. FIG. 12 shows,, the construction of a pagination data file. FIGS. 13 through 15 are diagrams of assistance in explaining the mounting and demounting of plates. FIG. 16 shows the construction of a data file for full pagination, embodying this invention. FIG. 23 (A) shows an example of the format of address printing data. FIG. 23 (B) shows an example of a folder index. FIGS. 26, 26A and 26B show the construction of a parts file embodying this invention. FIG. 27 shows the construction of a parts inventory file embodying this invention. FIGS. 29, 29A, and 29B show the construction of the essential part of a newsprint roll supply system embodying this invention.

DETAILED DESCRIPTION OF THE EMBODIMENTS

Figure 1:
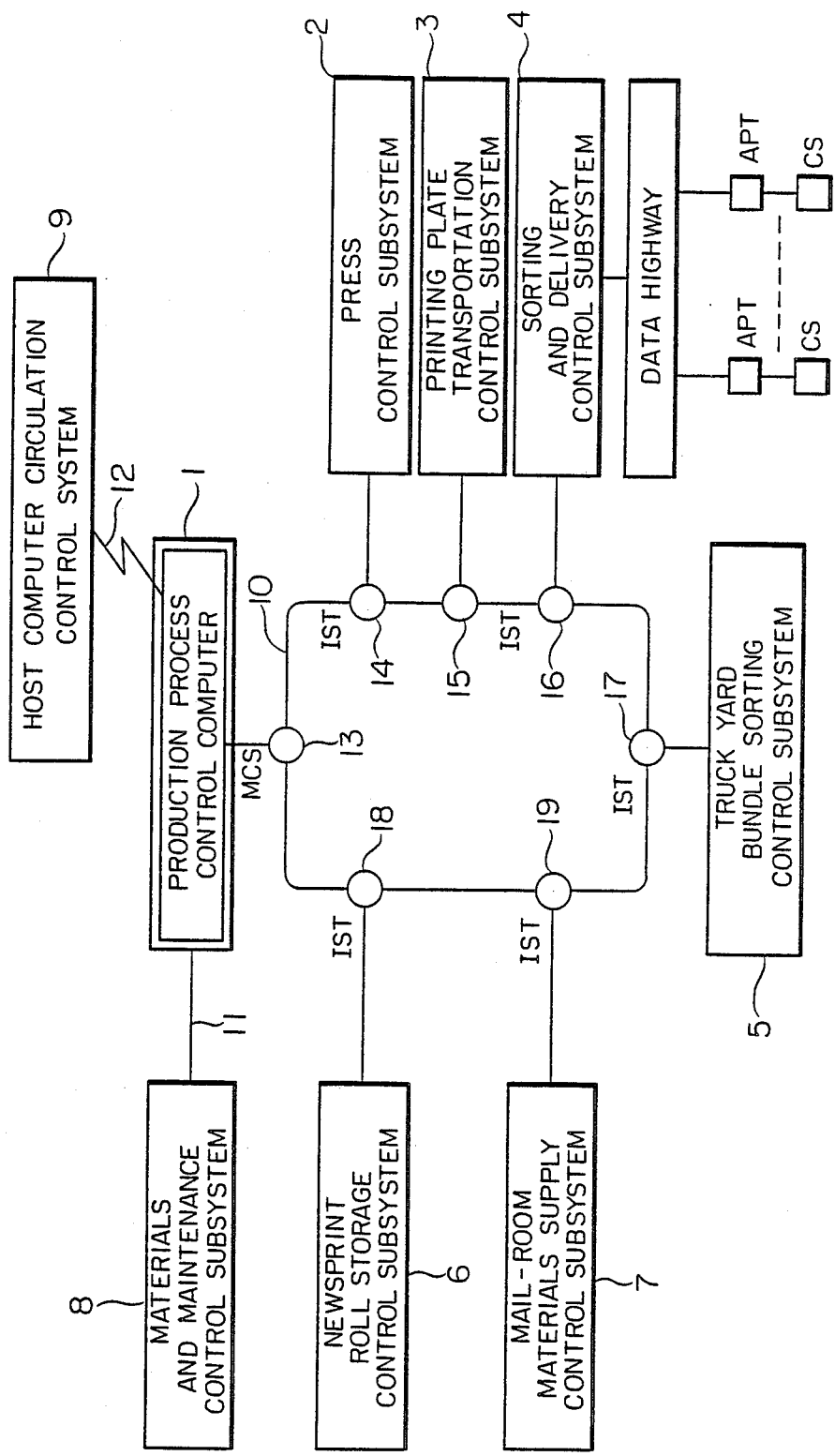
FIG. 1 is a diagram illustrating the overall construction of this invention.

In FIG. 1, numeral 1 refers to a production process control system for supervising and controlling the entire control subsystems shown in the figure, including preset-value processing; 2 to a press control subsystem for controlling the folding, printing and feeding units of a press; 3 to a printing plate transportation control subsystem for controlling plate layout by each press; 4 to a sorting and delivery control subsystem for real-time address label printing control and mail-room equipment control; 5 to a truck yard bundle sorting control subsystem for controlling bundle sorting and loading operation at each truck gate; 6 to a newsprint roll warehouse control subsystem for controlling the transfer of newsprint rolls from the warehouse to the newsprint roll storage or from the newsprint storage to the press feeding unit; 7 to a mail-room materials supply control subsystem for controlling the supply of newspaper mailing materials; 8 to a materials and maintenance control subsystem for recording the actual newspaper printing volume data and controlling maintenance; 9 to a circulation control subsystem for newspaper dealer control, that is, the control of the number of copies in circulation and newspaper transport business processing and sales business processing.

In FIG. 1, a master control station 13 is provided for the production process control system 1, and intelligent stations 14 through 19 are provided for the control subsystems 2 through 7. These stations are linked with each other via a ring-shaped data highway network 10 so that frame information is allowed to be circulated on the highway network 10 and data transmission is effected between the stations, using the frame information, as is well known.

Beside the highway network 10, a separate communication line 11 is provided between the production process control subsystem 1 and the materials and maintenance control subsystem 8. An independent bus 12 is also provided between the production process control system 1 and the circulation control subsystem 9.

The production process control system 1 supervises and controls the other control subsystems, including presetting various values for the press control subsystem 2. As newspaper printing is started and newspaper is printed off the line, newspaper is counted and stacked in the form of bundles in the sequence of delivery on the counter/stacker in the sorting and delivery control subsystem 4, address labels are attached to the bundles prepared in the real-time address label printing/tagging device, then the bundles are wrapped, the wrapped newspaper bundles are transferred to truck gates where the bundles are loaded on trucks for delivery in accordance with the processing results processed by the truck yard bundle sorting control subsystem 5.

Newsprint rolls are transported from the newsprint roll warehouse to the newsprint roll storage in accordance with the processing results processed by the newsprint roll storage control subsystem 6, and newsprint rolls are supplied to the press feeding unit in accordance with the instructions given by the press control subsystem 2. Thus, the newsprint rolls fed are automatically pasted to ensure uninterrupted newspaper printing.

The materials and maintenance control subsystem 8 keeps records of newspaper printing volume and other actual results and controls maintenance. In the configuration shown in FIG. 1, the production process control system 1 receives from the circulation control subsystem 9 reports on changes in the number of copies handled by newspaper dealers, feeds the data on the changes in the number of copies on the sorting and delivery control subsystem 4, the press control subsystem 2, etc.

Figure 2A:
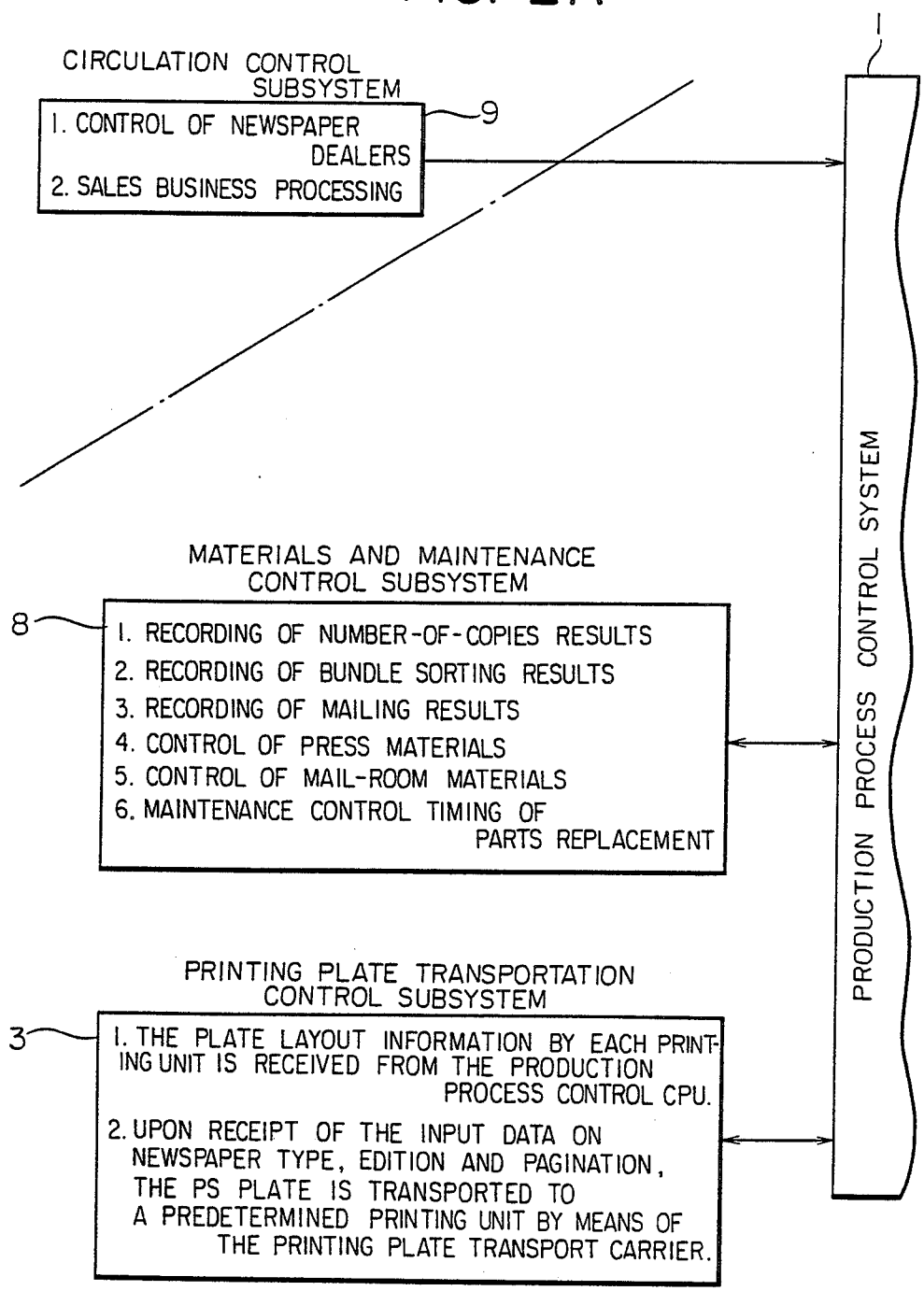
FIGS. 2 (A), (B), (C) and (D) are diagrams of assistance in explaining the division of processing functions among the control subsystems shown in FIG. 1.
Figure 2C:
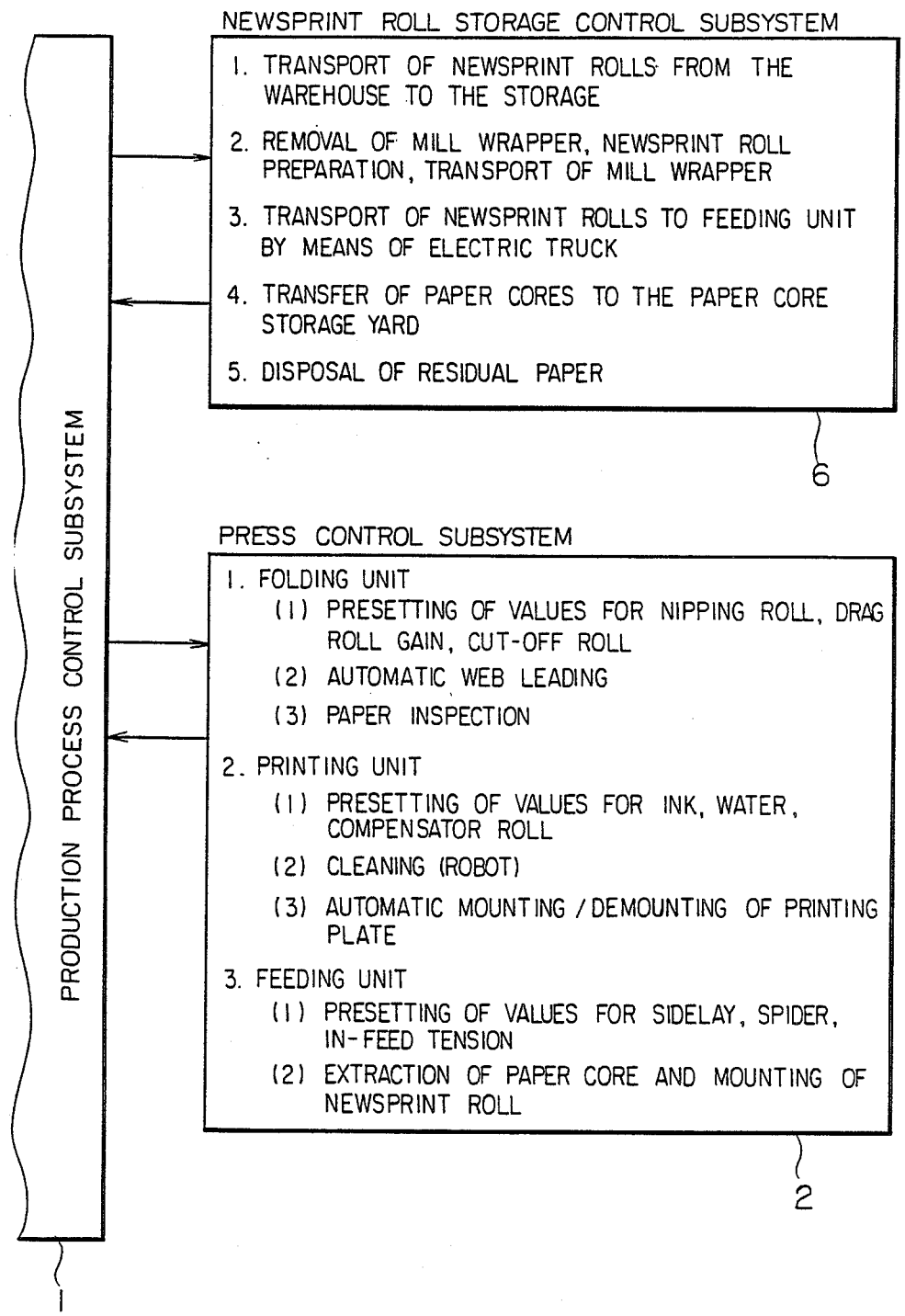
Figure 2D:
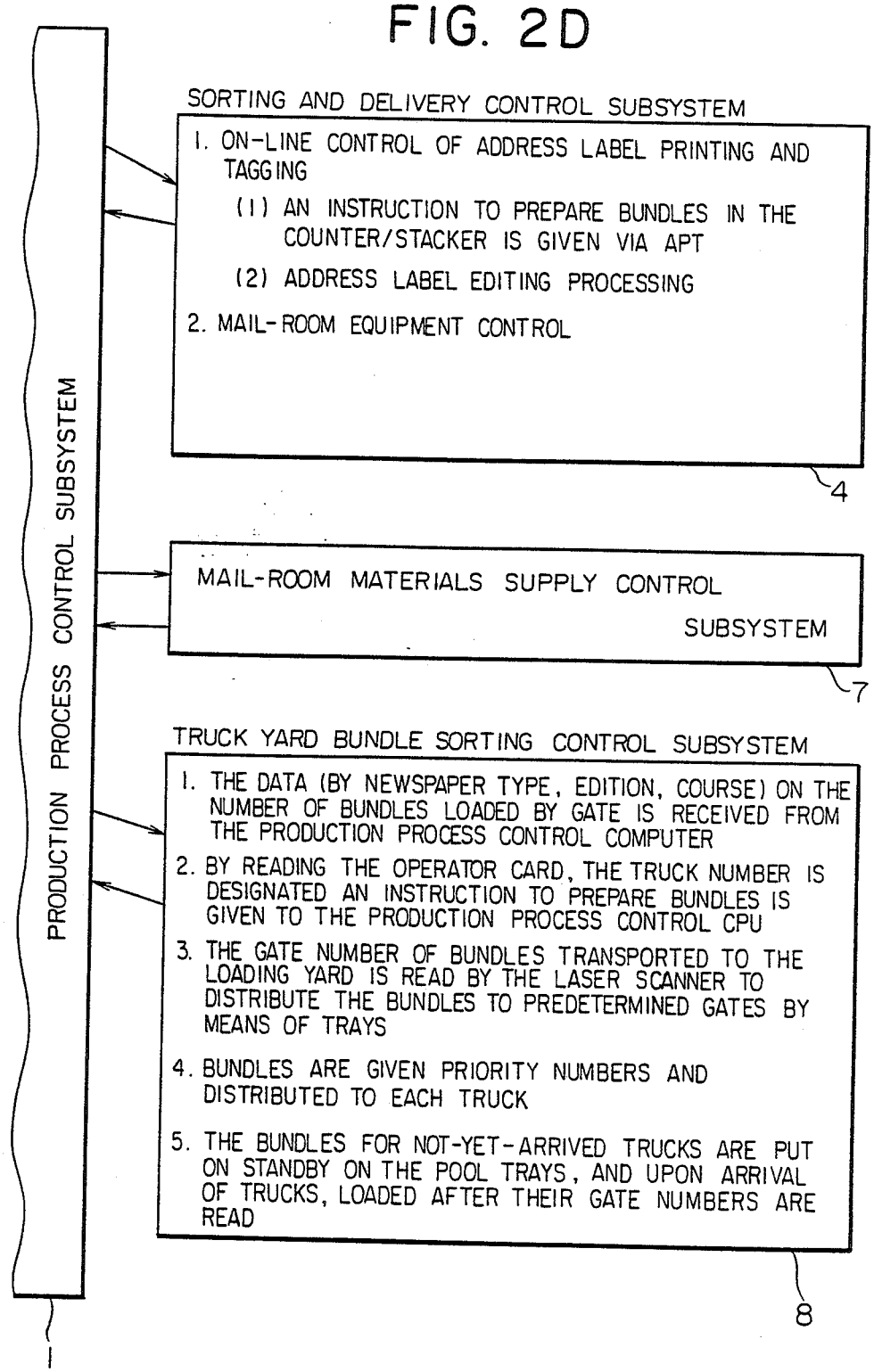

FIGS. 2 (A), (B), (C) and (D) are diagrams of assistance in explaining the division of processing functions among the control subsystems shown in FIG. 1, constituting one drawing in the aggregate. Numerals 1 through 9 in the figure correspond with like parts shown in FIG. 1. In the following, the processing functions performed by the control system and subsystem 1 through 9 will be described, referring to FIG. 2.

Processing functions performed by the production process control system 1 are roughly divided into the following classifications, as shown in FIG. 2.

(1.1) Processing functions relating to newsprint roll storage
  (1) Identification of the types of rolls (A, C, D) and calculation of the required number of rolls
  (2) Allocation of rolls to press feeding units
  (3) Display of operating conditions
(1.2) Processing functions relating to presses
  (1) Allocation of the number of copies to be printed to each folder
  (2) Layout of plate surfaces
  (3) Presetting of various values
  (4) Newspaper product adjustment
  (5) Display of operating condition
  (6) Maintenance record
(1.3) Processing functions relating to sorting and delivery
  (1) Allocation of the number of copies to be delivered to the counter/stackers
  (2) Delivery sequence processing (simulation)
  (3) Preparation of address data in the order of delivery
  (4) Treatment after deadline
  (5) Display of operating condition
  (6) Maintenance record
  (7) Supplies and materials record
(1.4) Processing functions relating to truck gates
  (1) Preparation of loading data by truck gate and truck
  (2) Display of loading condition
  (3) Maintenance record
(1.5) Processing functions relating to printing plates
  (1) Display of operating condition
  (2) Maintenance record
  (3) Disposal of waste plates Furthermore, the following can be added to "(1.2) Processing functions relating to presses."

(1.2.1) Production process control
Newspaper product adjustment

Newspaper product adjustment is performed by controlling the number of printing copies allocated by newspaper type, edition and folder and moving newspaper bundles so that off-the-press time can be agreed for each press.

A graphic display unit is installed at each work place to display operating condition and work instructions on its CRT screen.

(1.2.2) Data communication control

The production process control system 1 controls data communications with the press control subsystem 2 and other control subsystems via the highway network 10 using optical fibers.

(1.2.3) Control of various preset values

Various values such as the amounts of ink, water on the place surface, compensator, tension, etc. based on the input data on plate surface layout and web leading pattern.

Preset values are recorded, and maintenance information is printed.

Furthermore, the following can be added to the "(1.5) Processing functions relating to printing plate."

(1.5.1) Printing plates are transferred to the relevant presses and instructions are given to printing plate mounting/demounting robots, based on the input information on plate surface layout.

(1.5.2) Instructions are given to a device for recovering waste plates.

Processing functions in the press control subsystem 2 can be roughly divided into the following, as shown in FIG. 2.

(2.1) Processing functions relating to the press folding unit
  (1) Presetting of nipping roll, drag-roll, cut-off roll positions
  (2) Automatic web leading
  (3) Inspection paper
(2.2) Processing functions relating to the press printing unit
  (1) Presetting of various values for ink, water, and compensator roll position
  (2) Cleaning (robot)
  (3) Automatic mounting/demounting of printing plates (robot)
(2.3) Processing functions relating to the press feeding unit
  (1) Presetting of sidelay and spider position, and in-feed tension
  (2) Extraction of paper cores and mounting of newsprint rolls The following can be added to the (2.1), (2.2) and (2.3) above.
(2.1.1) Press folding unit
  (1) Presetting of various values for nipping rolls
  (2) Presetting of the gain of drag rolls
  (3) Presetting of cut-off roll position
  (4) Automatic web leading
  (5) Inspection paper extracting device
(2.2.1) Press printing unit
  (1) Presetting of ink volume
  (2) Presetting of dampener position
  (3) Presetting of compensator roll position
  (4) Plate mounting/demounting by the automatic printing plate mounting/demounting device (robot), and automatic plate transportation by the printing plate transport carrier
  (5) Disposal of waste plates
  (6) Cleaning of ink cylinders by the cleaning robot
  (7) Cleaning of paper guide rolls and angle bars by the cleaning robot
(2.3.1) Press feeding unit
  (1) Presetting of sidelay position
  (2) Presetting of spider position
  (3) Presetting of in-feed tension
  (4) Automatic mounting of newsprint rolls
  (5) Disposal of paper cores
  (6) Disposal of residual newsprint rolls Processing functions in the printing plate transportation subsystem 3 can be roughly divided into the following, as shown in FIG. 2 (A).

(3.1) The information on plate surface layout by each press is fed by the production process control system 1.

(3.2) Presensitized plates (PS plates) are transported to predetermined presses by the printing plate transport carrier in accordance with input information on newspaper type, edition and pages.

Furthermore, the information on set cylinder layout is transmitted to the computer (microcomputer) of the printing plate transportation control subsystem 3 from the production process control system 1 (information on printing plate transport). The printing plate processed on the basis of this information is transported to a predetermined printing unit by the printing plate transport carrier. The printing plate transportation control subsystem notifies the printing plate mounting-/demounting robot of the plate mounting position. An instruction to discard a printing plate is given to the printing plate mounting/demounting robot by the production process control computer, and the printing plate is removed from the cylinder by the printing plate mounting/demounting robot, and transported to the waste plate stocker. The waste plate stocker s transported on the printing floor to the waste plate yard by the transport carrier.

Processing functions in the sorting and delivery subsystem 4 are roughly divided into the following, as shown in FIG. 2 (D).

(4.1) Control of on-line address label printing/tagging device
  (1) To make the counter/stacker prepare newspaper bundles via the on-line address label printing/tagging device.
  (2) Address label editing processing
(4.2) Control of mail-room equipment In the following, (4.1) and (4.2) above will be described in more detail.

(4.1.1) Construction of mail-room equipment
  (1) Counter/stacker (with branching device)
  (2) Counter/stacker
  (3) Underwrapper
  (4) Address label printing/tagging device
  (5) Odd bundle stacker
  (6) Standard bundle plastic wrapper
  (7) Odd bundle plastic wrapper
  (8) Cross strapping machine
  (9) Odd bundle cross strapping machine
  (10) Octavo folding machine (with address label printing/tagging function)
  (11) Stand carrier and back-up carrier
  (12) Stack conveyor and bundle conveyor
  (13) Other queue conveyors, 90-degree diverter
(4.2.1) Sorting and delivery control
  (1) Address labels are printed on-line for bundles prepared in the counter/stacker and attached to the bundles.
  (2) The on-line address label printing/tagging device and the octavo folding machine with address label printing/tagging function incorporate fonts, and are capable of printing address labels based on the information on character code, character layout data, character size, truck-gate code (small-size data of approx. 512 bytes). This printer is a maintenance-free device capable of receiving transferred data (on the number of bundles and copies, address label printing information), making the counter/stacker prepare bundles, and printing and tagging address labels.
  (3) In order to back up the on-line address label printing/tagging device in a trouble, a back-up carrier is provided to enable to bundle preparation to be automatically switched over to other machines.
  (4) Since address labels are printed on-line, changes in bundle preparation can be performed easily to cope with changed destinations in an emergency.
  (5) Press sets can be easily changed.
  (6) Newspaper production adjustment can be performed by moving address labels.
  (7) Bundles can be prepared in sizes ranging from single-copy to quarto and octavo copies.
  (8) Address editing processing can be performed in the sorting and delivery control subsystem 4 where processing results are stored in an image master file.

In the truck yard bundle sorting control subsystem 5, the following functions are performed, as shown in FIG. 2 (D).
  (5.1) The data on the number of bundles to be loaded at each gate (by newspaper type, edition, course) is fed from the production process control system 1.
  (5.2) By reading the operator card, the truck number is designated, and an instruction for bundle preparation is given to the production process control system 1.
  (5.3) The gate number contained in the address label on a bundle transported to the loading yard is sensed by a laser scanner, and the bundle is transported by the tray to the predetermined gate.
  (5.4) Bundles are given priority orders, according to which they are distributed to each truck.
  (5.5) The bundles for which trucks have not yet arrived are set aside on standby on the pool tray. Upon arrival of trucks, the gate numbers on the address labels on them are read and loaded on the trucks.

The truck yard bundle sorting control subsystem 5 controls the following equipment.
  (1) Laser scanner
  (2) Tray conveyor
  (3) Truck loader
  (4) Storage conveyor
  (5) Integral control device (with built-in computer)
  (6) Operator console desk
  (7) Loading state display unit (LED) (8) Truck no. card input unit
  (9) Keyboard input unit
  (10) Operating state monitoring unit Now, truck loading operation will be described in more detail.
  (1) Bundle sorting data by gate (by newspaper type, edition, course) are received from the production process control system 1, and the sorting control of bundles transported from the sorting and delivery yard is carried out based on the data.
  (2) By reading the operator card, a truck number is designated, and an instruction for bundle preparation is given to the production process control system 1.
  (3) The gate number on a bundle transported to the loading yard is read by the laser scanner, and the bundle is transported by the tray to the predetermined gate.
  (4) Bundles are given priority orders, according to which they are distributed to each truck.
  (5) The bundles for which trucks have not arrived are set aside on standby on the pool tray. Upon arrival of trucks, the gate numbers on the bundles are read, and the bundles are loaded on the trucks.
  (6) The bundles whose gate numbers could not be read by the laser scanner can be transported to any desired gate by manually keying in new gate numbers with the keyboard.
  (7) The control information is given to the production process control system 1.

In the newsprint roll storage control subsystem 6, the following control functions are performed, as shown in FIG. 2 (C).
- (6.1) Transportation of newsprint rolls from the warehouse to the storage
- (6.2) Peeling-off of mill wrappers and preparation of paster, transportation of mill wrappers
- (6.3) Transportation of newsprint rolls to the press feeding unit by the tow conveyor, or the motor-operated truck
- (6.4) Transfer of newsprint rolls onto the traverser
- (6.5) Transportation of paper cores to the paper core storage yard
- (6.6) Disposal of residual newsprint rolls In the following, control functions in the newsprint roll storage control subsystem 6 will be described in more detail.
- (1) The information on the required number and size of newsprint rolls (A, C, D) is transmitted from the production process control system 1 to the newsprint roll storage control subsystem 6. (These data are calculated on the basis of the information on pagination, the number of copies, plate surface layout.) Since printing and operating schedules are set in advance for several days ahead, the required number of newsprint rolls to be transported from the warehouse to the storage can be known.
- (2) The information on newsprint roll consumption is notified to the production process control system 1, and the quantity of newsprint rolls to be discharged from the warehouse for printing on the next day is notified to the newsprint roll storage control subsystem 6 for materials control.
- (3) The newsprint rolls transported from the warehouse to the storage (the paster preparation floor) are subjected to mill wrapper peeling and paster preparation (up to pasting), and then transported to the press feeding unit.

In the materials and maintenance control subsystem 8, the following processing functions are performed, as shown in FIG. 2 (A).
- (1) Recording of data on no. of copies printed
- (2) Recording of bundle sorting data
- (3) Recording of loading data
- (4) Press materials control
- (5) Mail-room materials control
- (6) Maintenance control—determination of the timing of parts replacement Now, processing functions in the materials and maintenance control subsystem 8 will be described in more detail.

(8.1) Regarding materials and maintenance control
(8.1.1) Press
- (1) The parts list file is updated by collecting the information on the operation of the presses, and the maintenance information is output on the display or in the form of printed list.
- (2) The residual service lives of consumable parts for the folding, printing and feeding units are output in terms of the residual number of copies to be printed, the operating frequency and time.
- (3) The parts list for each residual service life is output.
- (4) The parts used for maintenance are registered for updating the parts list file.

(8.1.2) Data received from press
- (1) Main drive shaft revolution
- (2) Start and stop signals
- (3) Brush roller revolution
- (4) PH of dampening water
- (5) Paster activating signal
- (6) Slitter ON/OFF signal ( (8.1.3) Parts requiring maintenance
- (1) Blanket
- (2) Ink form roller
- (3) Ink distributor roller
- (4) Ink transfer roller
- (5) Ink pen roller
- (6) Dampening roller
- (7) Brush
- (8) Ink filter
- (9) Oil filter
- (10) Grease pump
- (11) Paster brush
- (12) Brush roll
- (13) PH
- (14) Clutch
- (15) Lubrication oil
- (16) Circulator filter
- (17) Dust collector filter
- (18) Shear key
- (19) Slitter
- (20) Brake disk
- (21) Cutting knife
- (22) Cutting rubber
- (23) Folding pin
- (24) Folding plate (8.1.4) Processing relating to parts requiring maintenance
- (1) When maintenance is performed in accordance with maintenance data, work items for the maintenance (inspection, replacement, etc.) are input to reset the maintenance data output. When parts replacement is input, the quantity of parts used for replacement is deducted from the stock volume on the parts inventory file.
- (2) When the stock volume of parts on the parts inventory list file becomes smaller than that at the time of parts ordering, an order form slip is printed by the printer.
- (3) When a part is delivered in the warehouse, the part number, the delivery quantity are input to update the parts inventory list file.
- (4) Abnormality (abnormal temperature) is detected by the temperature of bearings.
- (5) Noise and vibration are detected.

(8.1.5) Newsprint roll control
Soiled paper due to a trouble in the paster, the rates of success and failure of pasting, the number of newsprint roll consumption by size and other data are recorded, and the monthly or daily results can be printed.

(8.1.6) Parts control
Cylinder revolution is recorded, and the timing of replacement of press consumable parts (ex. blankets), the inventory of spare parts, maintenance data and other data are output on the display unit or in the form of printout to give warning.

(8.2) Relating to production control
(8.2.1) Recording of data on the no. of copies printed
Recording and graphic presentation of the actual number of copies printed (production results) per folder (8.2.2) Recording of bundle sorting data
Recording and graphic presentation of the operating results of the counter/stacker and other equipment (8.2.3) Recording of loading results Recording and graphic presentation of the operating results of the laser scanner and other equipment
(8.2.4) Display of process trouble records
(8.2.5) Display of trouble records by cause (for example, due to a trouble in the counter/stacker, or the press, etc.)
(8.2.6) Printout of record data
(8.2.7) Graphic presentation of production results The circulation control subsystem 9 performs;
(9.1) Newspaper dealer management—control of the number of copies in circulation, newspaper transportation and delivery
(9.2) Sales business processing, and notifies the daily or hourly information on the number of copies in circulation to the production process control system 1.

Figure 3A:
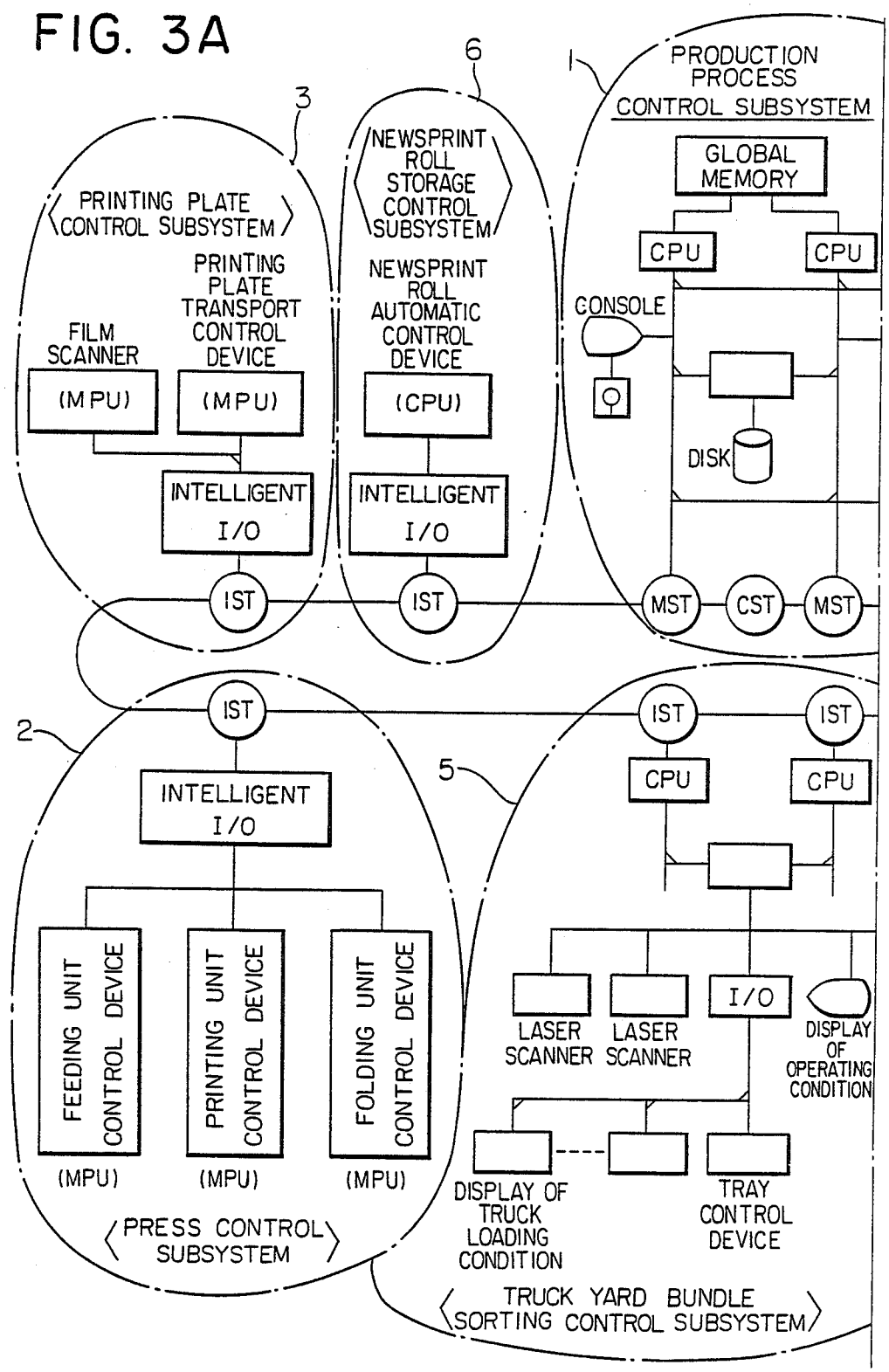

FIG. 3 shows the configuration of a system embodying the construction shown in FIG. 1. In the figure, numerals 1 through 10 correspond with like parts shown in FIG. 1. Symbol MST in the figure indicates a master station; CST a control station; IST an intelligent station, CPU a processor; Intelligent I/O an intelligent input/output control unit; MPU a microprocessor; ART an address label printing/tagging device; CS a counter/sticker; and DISK a disk memory, respectively.

In the figure, the production process control system 1 is linked with the control subsystems 2, 3, 4, 5, 6 and 7 via the optical fiber data highway network 10, and with the circulation control subsystem 9 and the materials and maintenance subsystem 8 via separate routes independently of the highway network 10.

The microprocessor MPU in the press control subsystem 2 performs control functions corresponding to the folding, printing and feeding units of the press, while the microprocessor MPU in the printing plate transportation control subsystem 3 performs film scanner control and printing plate transport control. The processor CPU in the newsprint roll storage control subsystem 6 performs newsprint roll preparation processing and newsprint roll transport control. The microporcessor in the mail-room materials supply control subsystem 7 serves as a mail-room materials supply device.

In the sorting and delivery control subsystem 4, a minor-loop data highway is provided to control the address label printing/tagging device APT.

Figure 4:
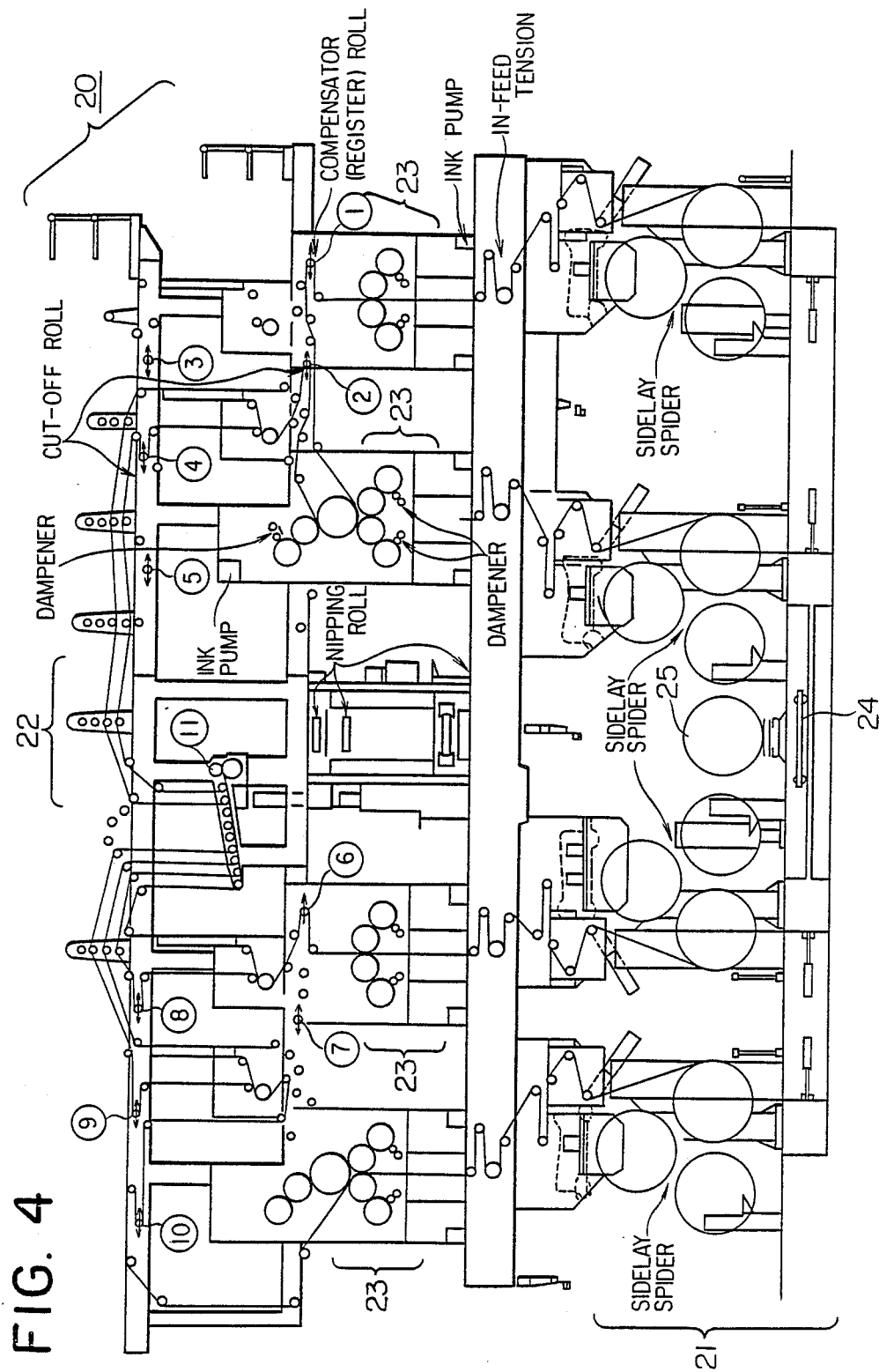
FIG. 4 shows the construction a printing unit embodying this invention, which is controlled by the press control subsystem.

FIG. 4 shows the construction of a press printing unit embodying this invention, which is controlled by the press control subsystem 2. In the figure, numeral 20 refers to a rotary press; four feeding units 21 each feeding newsprint rolls to the four printing units 23 are provided, as shown in the lower part of the figure. In the central part of the figure, folding units 22 are provided. Four printing units 23 are provided, two units each on left and right sides of the folding unit 22.

As will be described later, a newsprint roll 25 for which paster preparation has been completed is transported to the feeding unit 21 by means of the tow conveyor, or the motor-operated truck 24 (shown in the lower central part of the figure). A newsprint roll is mounted to the three arm reel of the feeding unit at a position shown as "sidelay and spider" in FIG. 4. The paper web is fed to the printing unit 23 from the feeding unit 21, and printed newspaper is led to the folding unit 22 where the newspaper is folded.

Figure 5:
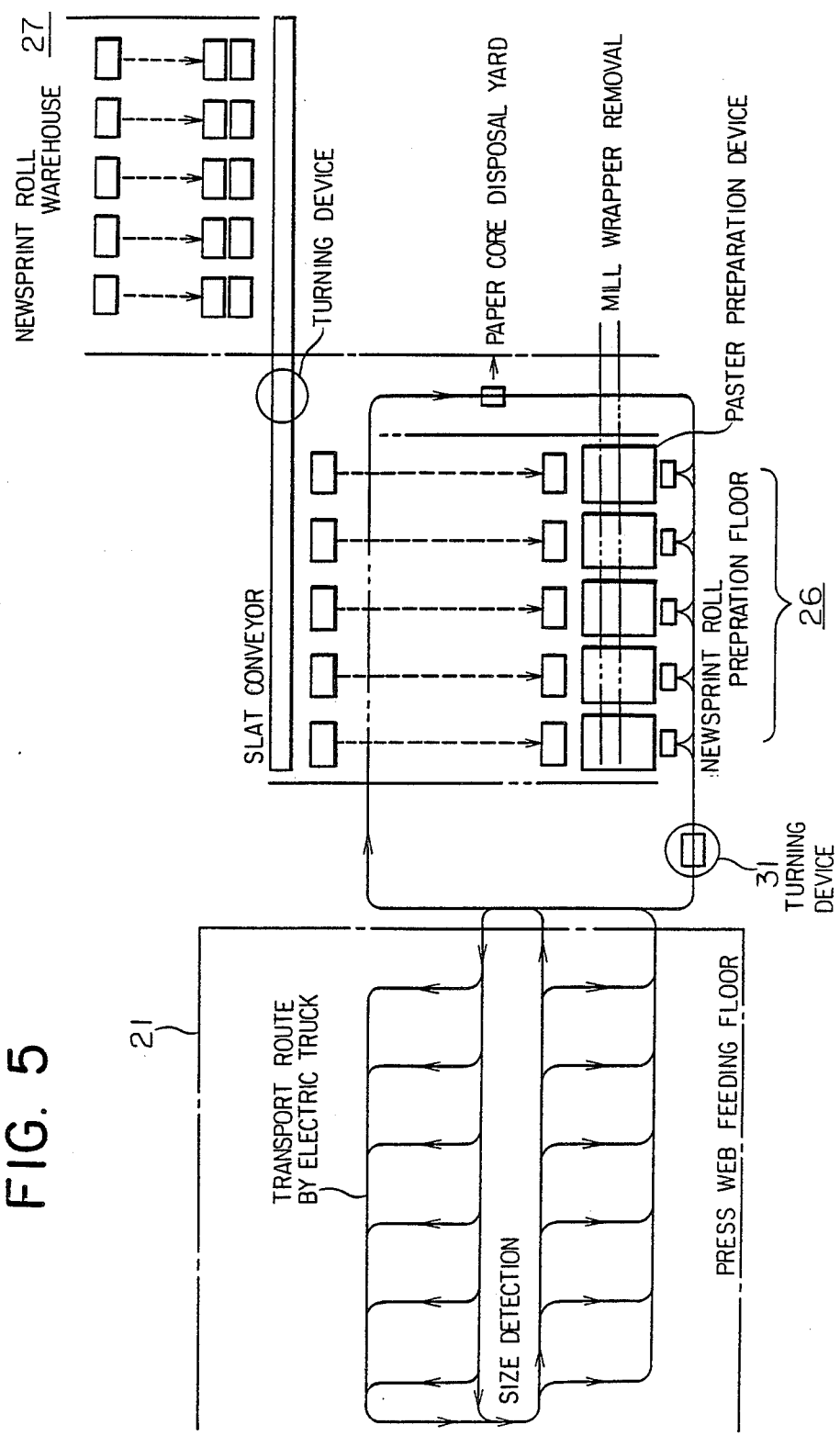
FIG. 5 shows the outlined construction of a newsprint roll warehouse being controlled by the newsprint roll warehouse control subsystem and the newspring roll preparation floor in the newsprint storage, both embodying this invention.

FIG. 5 shows the construction of the newsprint roll warehouse and the newsprint roll preparation floor in the newsprint roll storage, both controlled by the newsprint roll storage control subsystem 6. In the figure, numeral 21 corresponds to the feeding unit 21 of the press shown in FIG. 4. Numeral 26 refers to a newsprint roll preparation floor where newsprint rolls which have been stripped of mill wrappers and prepared for automatic pasting are reoriented by means of a turning device 31 to be fed to the feeding unit 21, as shown in FIG. 4. The paper cores of the newsprint rolls consumed in the press are returned to the newsprint roll preparation floor 26. Numeral 27 refers to a newsprint roll warehouse where newsprint rolls are stored. The newsprint rolls which have been stripped of mill wrappers are supplied to the newsprint roll preparation floor as necessary.

Although the construction of the printing plate transport system controlled by the printing plate transportation control subsystem 3 will be described later, referring to FIG. 6, it can be summarized as follows.

The printing plates prepared by the plate-processing machines 28-1 and 28-2 are led on the conveyor route to predetermined printing units in accordance with the control given by the microprocessor MPU in the printing plate transportation control subsystem 3, and then mounted on the printing units by means of the plate mounting robot. The waste printing plates are led on the conveyor route as shown by dotted lines in the figure to the waste plate disposal yard for disposal.

Though detailed diagrams have been omitted, FIG. 3 shows that when printing instructions are given to a plurality of address label printing/tagging devices by the processor CPU of the sorting and delivery control subsystem 4 via the minor-loop data highway, a predetermined number of newspaper copies are counted and stacked by the counter/stacker in accordance with the address label printing processing results, and the printed address labels, as noted above, are attached to the newspaper bundles, which are then brought under the control of the truck yard bundle sorting control subsystem 5.

The abovementioned process control system in newspaper printing has made it possible to complete the automation of the newspaper printing system. With this arrangement, it has been made possible to equip each control systems and subsystems with intelligence for efficient processing in a newspaper printing system in which a data highway network linking each control system and subsystem, supervised by the production process control system runs to a length of approximately 1 km. It has also been made possible to cope with changes in circulation real-time by introducing an on-line processing, rather than the conventional method relying on address labels that are printed off-line.

In the following, the individual systems will be described in detail.

Printing Plate Transportation Mounting/Demounting System

The printing plate transportation and mounting/demounting system corresponds largely with the portion relating to the printing plate transportation control subsystem shown in FIG. 1.

Figure 6:
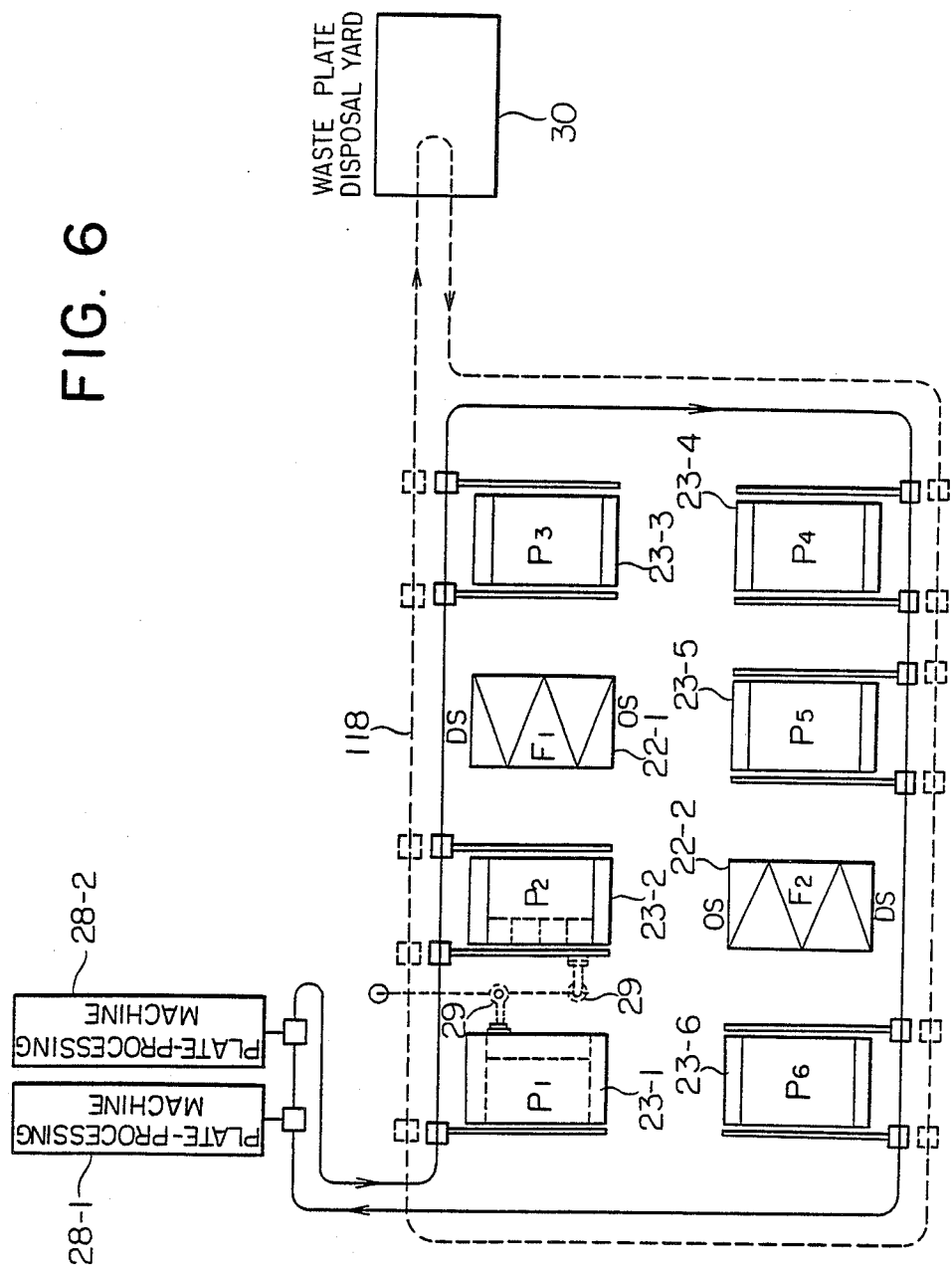
FIG. 6 is a schematic diagram illustrating a printing plate transportation and mounting/demounting system.

FIG. 6 shows the construction of the printing plate transportation and mounting/demounting system. Numerals 28-1 and 28-2 refer to plate-processing machines for processing desired printing plates; 112 to a printing plate transport carrier forming a route transporting the processed plates to the positions of the printing units $P_1$, $P_2$—; 118 to a rail for transporting wastes plates after printing to a waste plate disposal yard 30; 29 to a printing plate mounting/demounting robot; $P_1$, $P_2$—to printing units; $F_1$, $F_2$—to folding units, respectively.

The printing plates prepared in the plate-processing machines 28-1 and 28-2 are transported to the positions of the printing units $P_1$, $P_2$—, and mounted on the plate cylinders of the printing units by means of the robot 29 in accordance with the control information given by the production process control system, the printing plate control subsystem, and the press control subsystem. Upon completion of the predetermined printing, the printing plates are removed from the plate cylinders by the robot 29 and transported along the rail 118 to the waste plate disposal yard 30.

Figure 7:
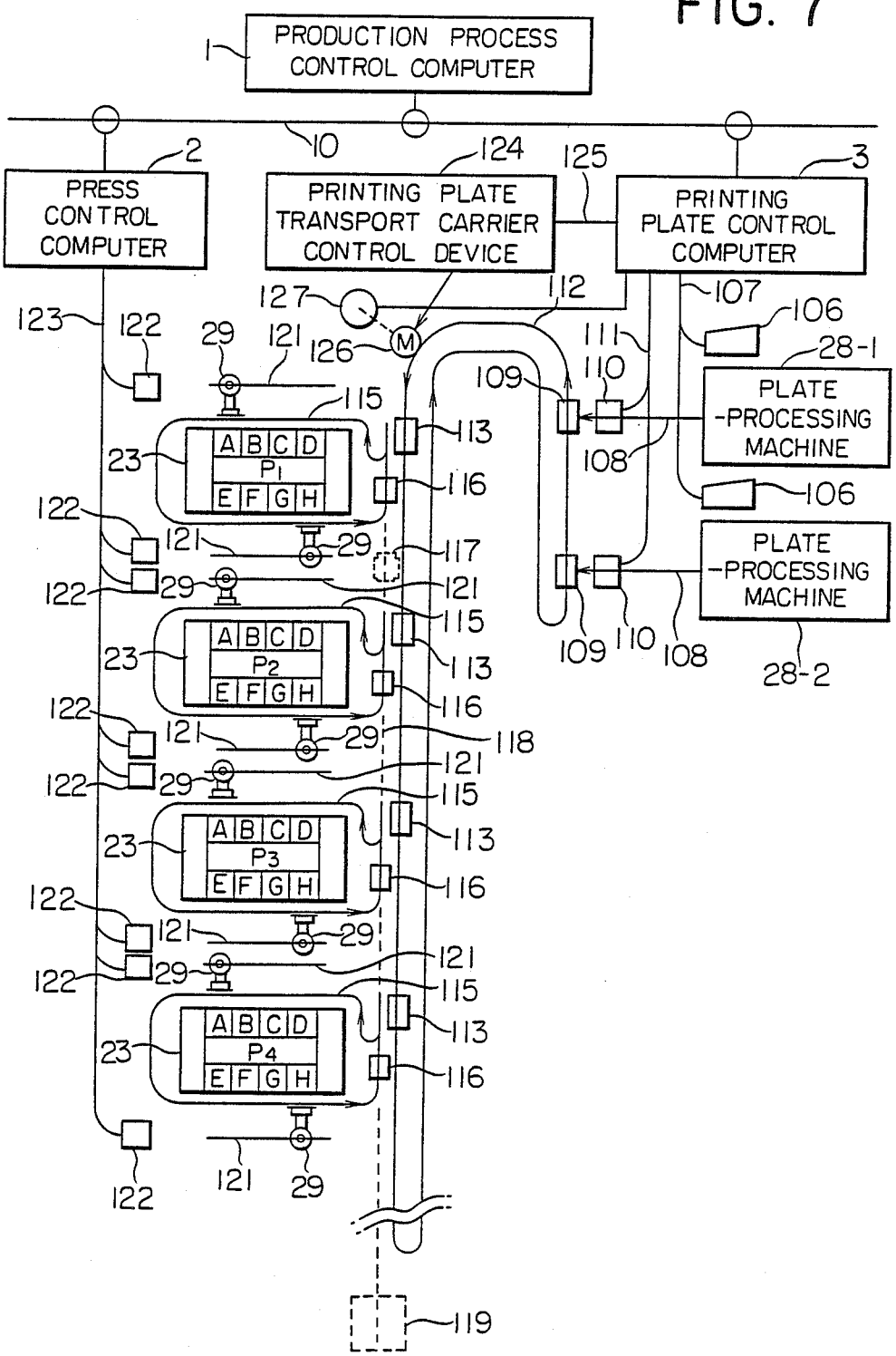
FIG. 7 shows the construction of the essential part of a printing plate transportation and mounting/demounting system embodying this invention.

FIG. 7 shows the construction of the essential part of the printing plate transportation and mounting-/demounting system. In the figure, numeral 1 refers to a production process control system; 2 to a press control subsystem; 3 to a printing plate control subsystem; 10 to a data highway network; 28-1 and 28-2 to plate-processing machines; 106 to a keyboard for inputting page numbers of the printing plates prepared by the plate-processing machines; 107 to an input signal line; 108 to a printing plate transport conveyor connected to the printing plate transport carrier; 109 to a loading device for transferring a printing plate to the printing plate transport carrier; 110 to an optical character recognition (OCR) device for reading numerals representing the page numbers, formed as lines on printing plates; 11 to an input signal line for OCR; 112 to a printing plate transport carrier; 113 to a printing plate unloading device for unloading the printing plate transported by the transport carrier; 23 to a printing unit; symbols A, B, C, D, E, F, G and H to schematic representations of printing plate mounting positions on the plate cylinder, which are usually expressed as surface A, surface B—; 115 to a printing plate transport subcarrier for transferring the printing plate unloaded by the printing plate unloading device 113 to a desired surface; 116 to a waste plate unloading device; 117 to a waste plate truck; 118 to a rail for the waste plate truck, which is embedded on the printing unit floor; 30 to a waste plate disposal yard; 29 to a printing plate mounting/demounting robot; 121 to a range in which the robot moves along; 112 to a robot control device; 123 to a bus connecting the robot control device and the press control subsystem 2; 124 to printing plate transport carrier control device for starting and stopping the carrier in accordance with the instructions given by the printing plate control subsystem 3, and controlling the printing plate transport subcarrier, the loading device, the unloading device and the printing plate transport conveyor; 125 to a control line; 126 to a motor for driving the printing plate transport carrier; and 127 to an encoder, equipped on the carrier drive shaft, for measuring the transport distance, respectively.

Instead of mounting a plurality of the printing plate mounting/demounting robot 29, one unit each of the robot 29 may be installed halfway of the two printing units 23 and 23 to mount or demount printing plates on the plate cylinders of the printing units 23 and 23 in front and rear of the robot 29. In such a case, the robot control devices are installed in a quantity corresponding to the number of robots.

The plate-processing machines 28-1 and 28-2 are connected to the printing plate transport carrier 112, which is connected to each printing unit 23 of the press. A printing plate prepared by either of the plate-processing machines 28-1 and 28-2 is transferred to the printing plate transport carrier 112 by means of the loading device 109. The destination of the printing plate is obtained by inputting the page number into the computer in the printing plate control subsystem 3, and searching the printing unit number, the plate cylinder number, the mounting position for the printing plate stored in the layout data file. The printing plate transported by the printing plate transport carrier 112 is unloaded by the printing plate unloading device 113 equipped on each printing unit 23, and transferred to the printing plate transport subcarrier 115 which is installed in such a way as to make the rounds of the printing units 23. The printing plate, when transported to the predetermined position thereof, is unloaded at a position where the printing plate mounting robot 29 receives the plate.

The printing plate is mounted on the plate cylinder when the printing plate control subsystem 3 notifies the press control subsystem 2 of the unloading of the plate at the plate mounting position of the printing units 23. The press control subsystem 2 then outputs a start instruction to the press control devices (supervisory panel, motor device panel—, not shown). Based on the instruction, the press control device drives the motor to rotate the plate cylinder, receives signal from the absolute encoder installed on the press main drive shafts, detects the plate mounting position, stops the plate cylinder, and informs the robot control device 122 of the start of plate mounting. Based on the instruction, the robot 29 receives the printing plate from the unloaded position, inserts the trailing edge of the plate into the plate inserting position. Upon completion of insertion, the robot control device 122 transmits an insertion end signal to the press control subsystem 2. Upon receipt of the insertion end signal, the press control H subsystem 2 drives the press control device again, detects the plate gripping position from the absolute encoder, stops the plate cylinder, gives a plate gripping instruction to the robot control device 122. Upon receipt of this signal, the robot control device 122 locks up the plate on the plate cylinder. When a plate lock-up end signal is given by the robot control device 122 to the press control subsystem 2, the same operations are repeated to mount the next plate on the plate cylinder.

Discarding of a printing plate is carried out at the end of printing or before the replacement of the printing plate. Similarly to the plate mounting operation, the press control subsystem 2 drives the press control device, detects the plate removal position by means of the absolute encoder, stops the plate cylinder, and transmits the plate discarding instruction to the robot control device 122. Upon receipt of the plate discarding instruction, the robot control device 122 releases the plate lock-up device, removes the plate from the plate cylinder, and returns the plate to the plate unloading device. With these operations, a plate to be discarded can be returned to the plate unloading device. Upon completion of this operation, an operation end signal is given to the printing plate control subsystem 3 by the robot control device 122.

The printing plate control subsystem 3 receives the plate discarded by the printing plate transport subcarrier 115, which is installed in such a manner as to make the rounds of the printing units 23, from the printing plate unloading device by means of the printing plate gripper, and transfers the waste plate to the waste plate unloading device 116 to transport to the waste plate disposal yard 30.

Though not shown in FIG. 7, a printing plate gripper is provided on the transport chain of the printing plate transport carrier. The printing plate gripper grips the printing plate at the plate loading device to transfer the plate to the printing plate transport subcarrier 115 at the printing plate unloading device. The distance from the plate loading device to the plate unloading device is stored in the form of the number of pulses in the printing plate control subsystem 3 so that when a printing plate is transported to a predetermined unloading device upon receipt of the pulses transmitted by the encoder 127 (when the number of pulses agrees with the contents of the stored data), the printing plate is transferred to the printing plate transport subcarrier 115 by the printing plate transfer device, which will be described later. A printing plate gripper is also provided on the transport chain of the printing plate transport subcarrier 115. A chain drive motor and an encoder are also installed on the printing plate transport subcarrier 115. Pulse signals for the encoder are input into the printing plate control subsystem 3.

FIG. 8 is a schematic diagram illustrating the state where a printing plate transported from the plate-processing machine is transferred to the printing plate transport carrier.

In the figure, numeral 108 refers to a chain-driven printing plate transport conveyor; 202 to a printing plate carriage installed on the chain; 203 to a printing plate; 204 to a loading chain; 205 to an elevator installed on the loading chain; 206 to an air cylinder; 207 to a mounting base of the air cylinder; 208 to a sucker installed at the tip of the air cylinder rod; 209 to a printing plate gripper; and 112 to a printing plate transport carrier, respectively.

(A) in the figure indicates the state where the printing plate 203 is transported by the transport conveyor 108 to the elevator transfer portion of the loading device. (B) is a drawing illustrating the state where the printing plate 203 is transferred to the elevator 205 as the elevator 205 is driven. (C) is a diagram illustrating the state where he elevator 205 transports the printing plate 203 to the loading device and the sucker 208 sucks the plate 203 as the air cylinder 206 is actuated. After the printing plate 203 is sucked by the sucker 208, the elevator 205 moves down ward, waiting for the next printing plate. (D) is a diagram illustrating the state where the sucker sucks the printing plate 203, and the air cylinder 206 is actuated to move the plate to the gripping position of the gripper 209. After this operation, the gripper is lifted upward, gripping the printing plate 203, the sucker stops sucking, and the air cylinder 206 moves back to the start position. With these operations, the printing plate 203 transported from the plate-processing machines 28-1 and 28-2 is transferred to the printing plate transport carrier 112.

FIG. 9 is a diagram illustrating the unloading portion of the printing plate transport carrier and the state where a printing plate is transferred to the printing plate transport subcarrier.

In the figure, numeral 203 refers to a printing plate; 209 to a gripper; 112 to a printing plate transport carrier; 115 to a printing plate transport subcarrier; 212 to an air nozzle; 213, 214 and 215 to printing plate transfer devices, respectively.

(A) shows the state where the transfer device receives printing plate 203 transported by the printing plate transport carrier 112. The printing plate 203 transported to a plate immediately before the unloading portion while being held by the gripper 209 is moved to a printing plate position 203' shown by dotted lines by means of the air nozzle 212. When the printing plate transport carrier 112 stops at the printing plate transfer portion, the air nozzle 212 also stops air blowing. The gripper 209 then moves to a new position 209' to transfer the printing plate 203 to the printing plate transfer device. (B) of the figure illustrates the state where the printing plate 203 is transferred to the printing plate transport subcarrier 115. The printing plate transfer device 213 receives the printing plate 203 and moves around the shaft a in such a fashion as shown in the figure. After that, the receiving lever 214 moves around the shaft b to a new position 214', and the printing plate 203 is moved to a position at which the gripper 209 grips the printing plate 203, and then to a gripper position 209" where the plate 203 is transferred to the gripper 209.

Figure 10C:
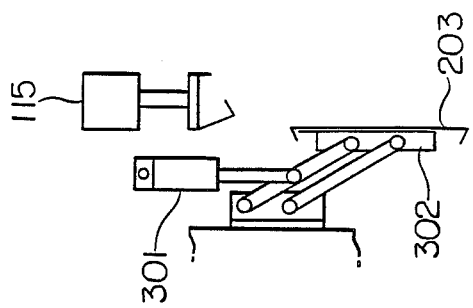
Figure 10B:
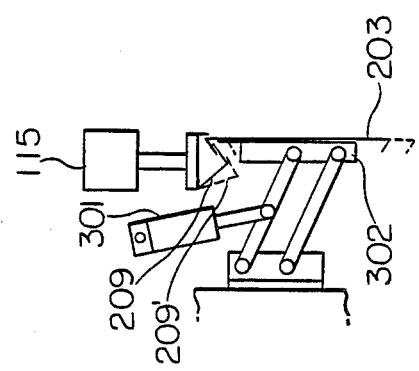
Figure 10A:
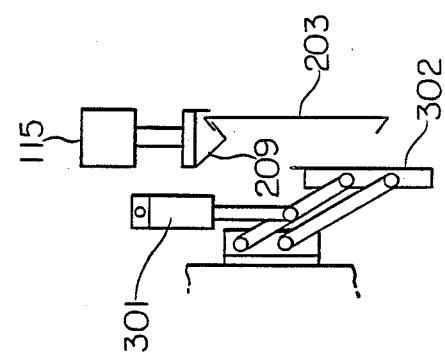

FIG. 10 is a diagram illustrating the state where the operation of the printing plate transfer device which transfers the printing plate transported by the printing plate transport subcarrier of the printing unit to the printing plate mounting/demounting robot.

In the figure, numeral 301 refers to an air cylinder; 302 to a printing plate transfer device; 203 to a printing plate; 209 to a gripper; and 115 to a printing plate transport subcarrier, respectively. (A) illustrates the state where the gripper 209 grips the printing plate 203 and moves to the plate transfer position. (B) illustrates the state where the printing plate transfer device 302 is lifted by the air cylinder 301 up to the grip position, and then the gripper 209 moves to a new position 209' where the printing plate 203 is transferred to the printing plate transfer device 302. (C) illustrate the state where the air cylinder 301 is returned to the original state after the gripper 209 receives the printing plate 203.

The printing plate transfer device is installed at each plate cylinder. The robot 29 receives the printing plate 203 in the state shown in (C). The printing plate 203 after the completion of printing is removed from the plate cylinder by the robot 29 and then transferred to the plate transfer device 302 shown in (C). Then, the printing plate 203 is transferred to the gripper 209 in the operating sequence of (C)—(B)—(A).

Figure 11:
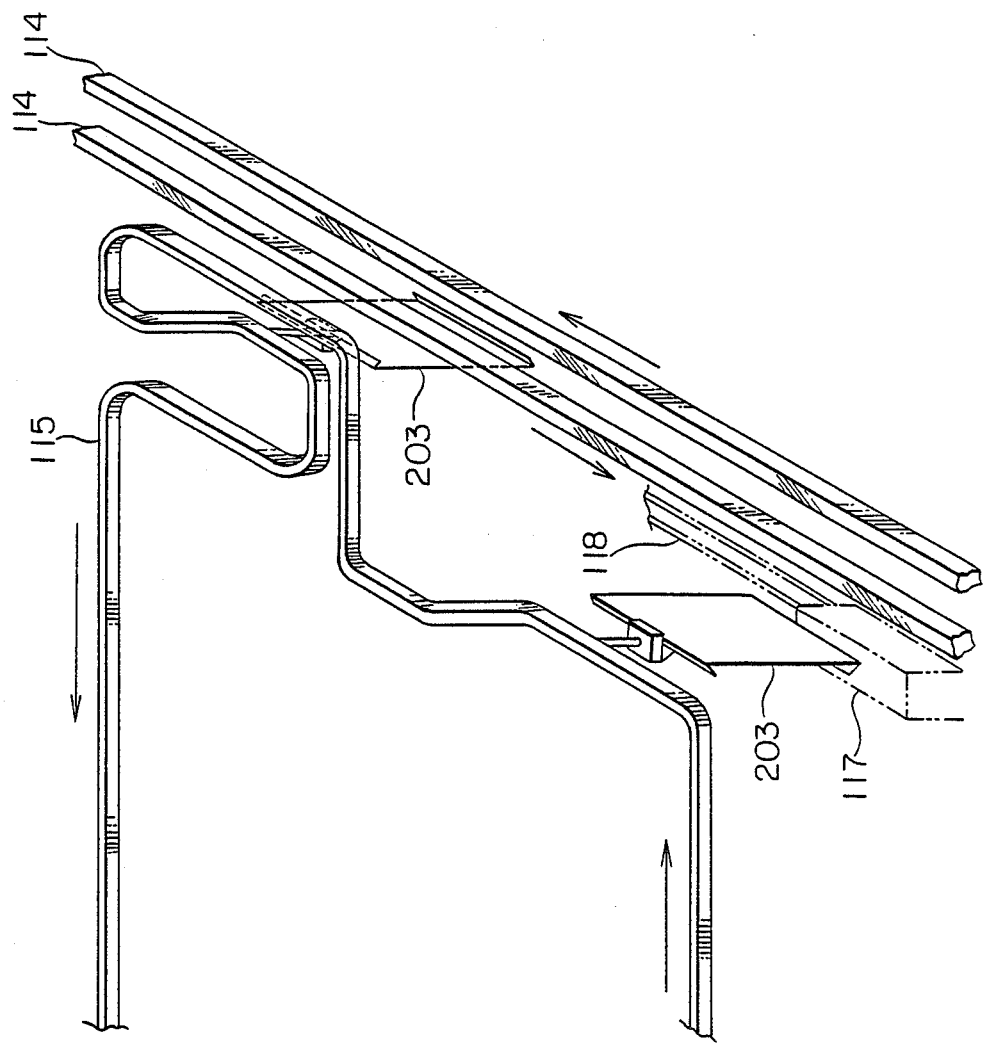
FIG. 11 is a diagram of assistance in explaining the relative positions of a plate transport carrier and a plate transport sub-carrier.

FIG. 11 illustrates the printing plate transport carrier 112, the printing plate transport subcarrier 115, the rail 118 on the floor, which is shown by alternate long and two short dash lines, and the waste plate truck 117 running on the rail 118.

FIG. 12 illustrates a printing plate pagination data file used in this invention. The file is prepared by the production process control system 1, and transmitted before plate processing to the printing plate control subsystem 3 via the data highway network 10 shown in FIG. 6 to store the file in the subsystem 3. The file has the information on edition number, printing unit number, plate cylinder number, page number corresponding to plate cylinder surface, designated colors (to be used in color printing), and the number of plates to be processed (to be used for plate processing control). By inputting into the printing plate control subsystem 3 the page numbers of plates sequentially processed in the plate-processing machines 28-1 and 28-2 and transported by the conveyor, the destinations of the plates are searched from the file, and the plates are transported to their respective destinations (printing units). The printing plate control subsystem 3 stores all the information on the printing plates that have been transported.

When the printing plates are transferred to the transfer devices at the plate cylinders in accordance with the aforementioned plate transporting procedures, the data consisting of edition number, press number, plate cylinder surface, page number, designated colors are transmitted from the printing plate control subsystem 3 to the press control system 2 via the production process control subsystem 1. The press control subsystem 2, on the other hand, receives and stores the plate surface layout data file transmitted from the production process control system 1 before plate processing. On the basis of the data file and the data transmitted from the printing plate control subsystem 3, check is made to see whether all the printing plates have been transported, and after confirming that all the plates have been transported, the data on the work range (data on plate cylinder surface) are transmitted to the robot, and instructions are given to the press control device and the robot to mount the plates on the plate cylinders.

Figure 13:
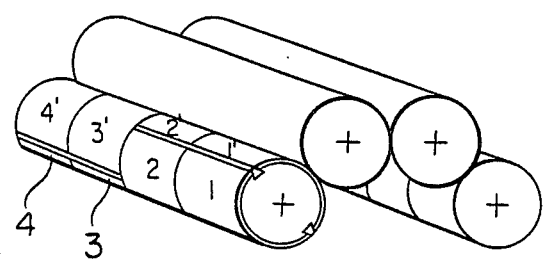

FIG. 13 illustrates the state where printing plates are mounted on a plate cylinder on the printing unit. "1" and "1'" refer to the plate cylinder surface A, "2" and "2'" to the plate cylinder surface B, "3" and "3'" to the plate cylinder surface C, "4" and "4'" to the plate surface D, with two identical printing plates mounted on the circumference of the plate cylinder; the printing plates mounted on the plate cylinder surfaces A and B being staggered in the circumferential direction with the plate cylinder surfaces C and D.

Figures 14A, 14B, 14C:
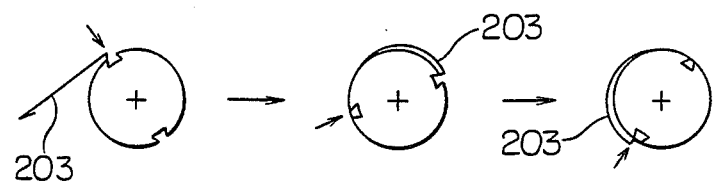

FIG. 14 illustrates the state where the rotating positions of a plate cylinder consist of three positions in the mounting and demounting of printing plates on the plate cylinder by the robot. That is, (a) indicates the position at which the plate is inserted, (b) the position at which the plate is gripped, and (c) the position at which the plate is removed. All told, twelve positions per plate cylinder are required to mount and remove printing plates on a plate cylinder. Mounting printing plates on individual plate cylinders of individual presses by an industrial robot would require much time, reducing the benefits of automation through the introduction of robots. A control method overcoming this problem will be described in the following, referring to FIG. 7.

Printing plates are mounted on a plate cylinder in the following manner. When all the required number of printing plates have been unloaded on the printing plate mounting positions of the printing units, the printing plate control subsystem 3 informs the press control subsystem 2 of the fact. The press control subsystem 2 gives a start instruction to the press control devices (supervisory panel and motor device panel) to drive the motor to rotate the cylinder. The press control subsystem 2 then receives a signal (data on the absolute rotating angle of the plate cylinder) from the absolute encoder mounted on the main drive shaft, and when the press control subsystem 2 detects the aforementioned plate inserting position, gives a rotation stop signal to the supervisory panel to obtain that position. The press control subsystem 2 immediately gives a plate insertion start signal to the robot control device 122. The robot 29 receives a printing plate and inserts the trailing edge of the plate 203 into the plate inserting position of a plate cylinder. An insertion end signal is given from the robot control device 122 to the press control subsystem 2. Upon receipt of the insertion end signal from the robot 29, the press control subsystem 2 again gives a start instruction to the press control device to rotate the plate cylinder, detects the plate gripping position from the absolute encoder, gives a rotation stop signal to the press to obtain that position. The press control subsystem 2 immediately gives a plate lock-up signal to the robot control device 122. With this signal, the robot control device 122 drives the lock-up cylinder to mount the plate 203 on the plate cylinder. As a lock-up end signal is given from the robot control device 122 to the press control subsystem 2, an instruction to start the mounting of a printing plate on the next plate cylinder surface is given from the press control subsystem 2 to the robot control device 122. By repeating these operations, all the printing plates are mounted on the plate cylinders. Description on the motion and movement of the robots has been omitted.

FIG. 15 is a diagram illustrating the construction of a system for automatically mounting and demounting a printing plate using a printing plate mounting/demounting robot.

Numeral 1 refers to a production process control system; 2 to a press control subsystem; 3 to a printing plate control subsystem; 10 to a data highway network; 405 to a supervisory panel; 406, 408, 409 and 417 are control lines; 407 to a motor device panel; 410 to a main drive shaft; 411 to an absolute encoder mounted on the press main drive shaft; 412 to a motor; 23 to a printing unit; 22 to a folding unit; 29 to a printing plate mounting/demounting robot; and 122 to a robot control device, respectively.

The number of installations of the printing plate mounting/demounting robot 29 and the robot control devices 22 may be one unit each between the printing units 23 and 23, as described with reference to FIG. 2.

Since removal of the printing plate is obvious from the above description, description has been omitted.

FIG. 16 shows an example of the plate layout data file. This file is stored in the memory device of the production process control system 1 after plate layout has been completed. Every time the layout of each printing plate has been completed, the information on what page of the next edition will be replaced is transmitted to the printing plate control subsystem 3 and the press control subsystem 2 and stored in each control system and subsystems. This file is used when updating a printing plate. Circles in the figure denote the completion of plate layout.

The above description is concerned with the case where three computers are used. It is obvious that control can be effected by one computer.

Sorting and Delivery Processing System

The sorting and delivery processing system corresponds mainly with the sorting and delivery control subsystem 4 shown in FIG. 1.

In the conventional sorting and delivery processing system, A method has heretofore been practiced in which preprinted address labels are arranged in advance in the stacking order and set in the address label reading and tagging device which reads the data on the number of copies per bundle coded on the address label in the form of bar codes or numerals and gives the data to the counter/stacker, or reads dealer code on the address label to give the data on the number of copies per bundle from the computer to the counter/stacker, which in turn prepares newspaper bundles, and address labels are attached to the bundles taken out of the counter/stacker. Another method has also been practiced in which the data on the number of bundles is given in the bundle dispatching order from the computer to the counter/stacker to prepare bundles, and when the bundles are taken out of the counter/stacker to the stack conveyor, the data on the names of newspaper dealers and the number of copies per bundle for the bundles is displayed to check the contents of the address labels and the displayed data. After that, the address labels are attached to the bundles.

When the same type of newspaper is printed on a plurality of presses, it has heretofore been practiced that the total number of copies to be printed are distributed evenly among the presses. It is extremely difficult, however, to complete printing on all the presses at the same timing. Aside from these problems, newspaper transportation usually involves closely programmed time shcedules for the departure and arrival of trucks because of various types of newspaper editions printed in the same time zone. It is necessary therefore to strictly control the timing of newspaper printing for each edition and each truck transportation course. To achieve this control, the operator has to monitor the timing of newspaper printing at all times. If any trouble takes place, the operator must change the allocated number of copies to the presses and move the address labels to the other presses (in a failure of CS or the address lable printing/tagging device). These operations require a large number of operators, deteriorating the efficiency of newspaper production.

Figure 17:
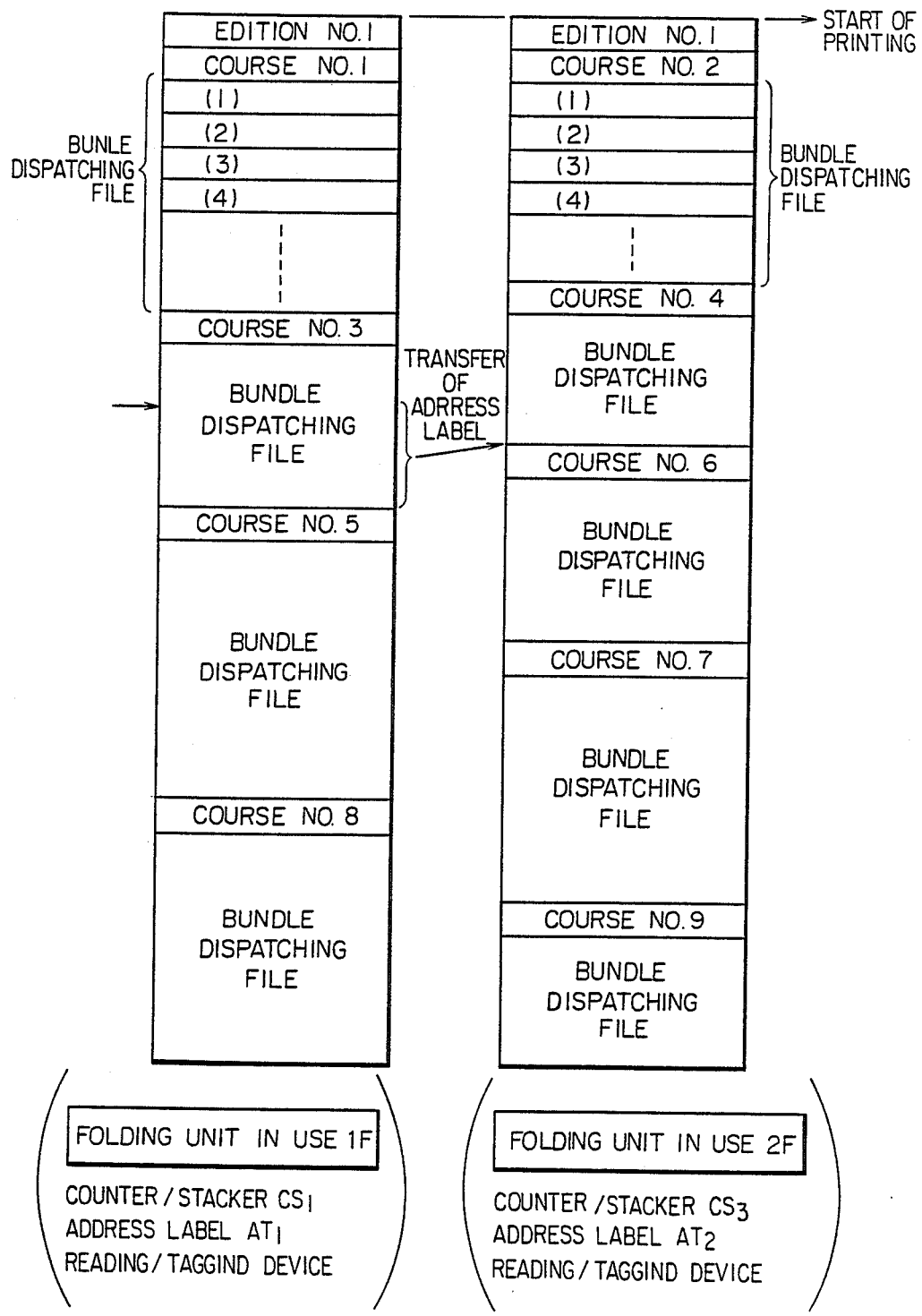
FIG. 17 is a diagram of assistance in explaining the conventional type of sorting and delivery processing.

In other words, the conventional sorting and delivery system is an address label-oriented system, which is shown in FIG. 17. In FIG. 17, the folding units 1F and 2F are now in operation in which bundles of newspaper copies of No. 1 edition are prepared for No. 1 through No. 9 destinations. A bundle dispatching order exists for each course, and a stacking order exists for each newspaper dealer within a course. All these orders are generally expressed as a bundle dispatching order. Bundles are prepared in accordance with the order of bundle preparation (serial number).

In the example shown in Fi. 17, bundle allocation is carried out in accordance with the bundle dispatching order so that the bundles to be dispatched to No. 1, No. 3, No. 5 and No. 8 courses are prepared in the folding unit 1F, while the bundles to be dispatched to No. 2, No. 4, No. 6, No. 7 and No. 9 courses are prepared in the folding unit 2F. And, address labels corresponding to the above order are prepared and attached to the bundles. If the counter/stacker or the address label reading/tagging device fails, however, bundles have to be produced by rearranging and moving the address labels to the address label reading/tagging devices of the other presses in accordance with the departure and arrival of trucks. In the example shown in FIG. 17, address labels have to be moved to the folding unit 2F to produce the corresponding bundles, and the number of copies allocated to each press also has to be changed accordingly. The mailing ledger consisting of the number of copies to be delivered to dealers and transportation information is registered in the computer of the production process control system 1 as the bundle dispatching master file. The information in this master file is arranged for each printing edition and each truck transportation course. On the day of newspaper printing, the updating of the bundle dispatching master file is carried out as to changes in the number of copies and changes in transportation information, and the master file is allocated to the counter/stacker equipped with each folding unit in accordance with the bundle dispatching order, as shown in FIG. 17, and the bundle dispatching order file is prepared for each press, and address labels are prepared in accordance with that order and set to the address label reading/tagging device.

Figure 18:
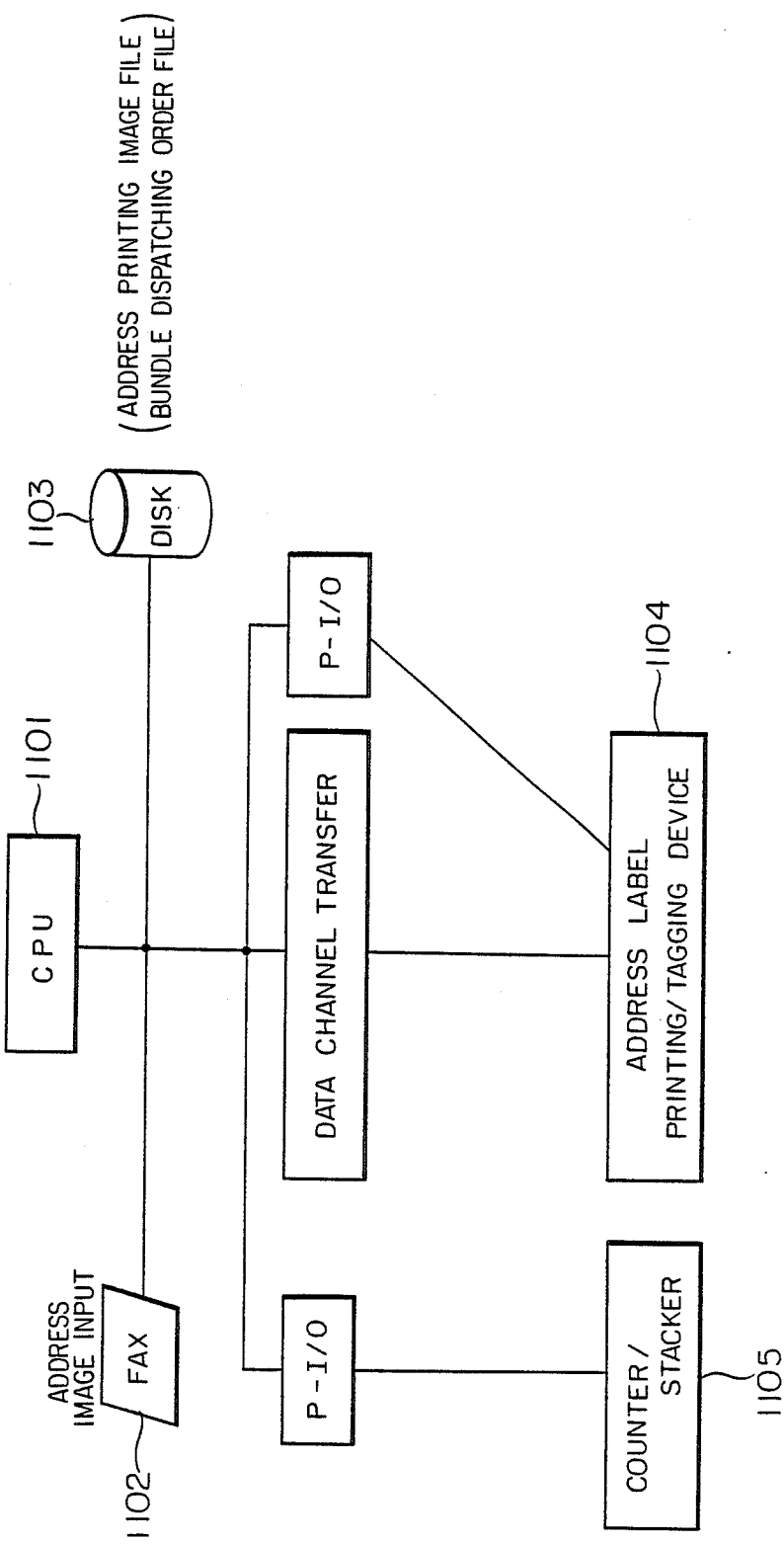
FIG. 18 shows an example of the conventional sorting and delivery system.

In addition, a method or printing address labels on-line and attaching the address labels to the corresponding bundles has been considered. In this method, the original images of manually written address labels or printed address labels are read by the pattern reader or fax 1102 and registered in the magnetic disk 1103 as image data, and a master file is produced by relating the image data to the bundle dispatching master file, and the contents of the disk 1103 are transmitted in accordance with the bundle dispatching order file to the address printing/tagging device 1104 which in turn prints address labels on-line, while bundles are produced by the counter/stacker 1105 which is given the data on the number of copies per bundle by the computer 1101, and the address labels are attached to the bundles produced. In the example shown in FIG. 18, however, the volume of information of the address image data becomes of the order of 15 KB to 20 KB even after data compression. This means that an image data of 150 MB to 200 MB would be required to cover 10,000 newspaper dealers. The system to control dozens of address label printing/tagging devices and the counter/stackers must be of a type constructed by a multitude of computers. Furthermore, the real-time processing of the large volume of information involved in an address label cannot be covered by the capacity of a single disk, necessitating the distribution of disks among computers, even if a data transmission system using data channels is adopted.

As described above, various means have been considered to realize a total system for the integrated computer control of newspaper printing and delivery processes. In order to complete a total newspaper printing and delivery computer control system, however, it is essential to automate sorting and delivery processes.

This invention is intended to substantially reduce the information on address labels from a higher-level control subsystem and flexibly cope with the occurrence of troubles, printed on-line.

Figure 19:
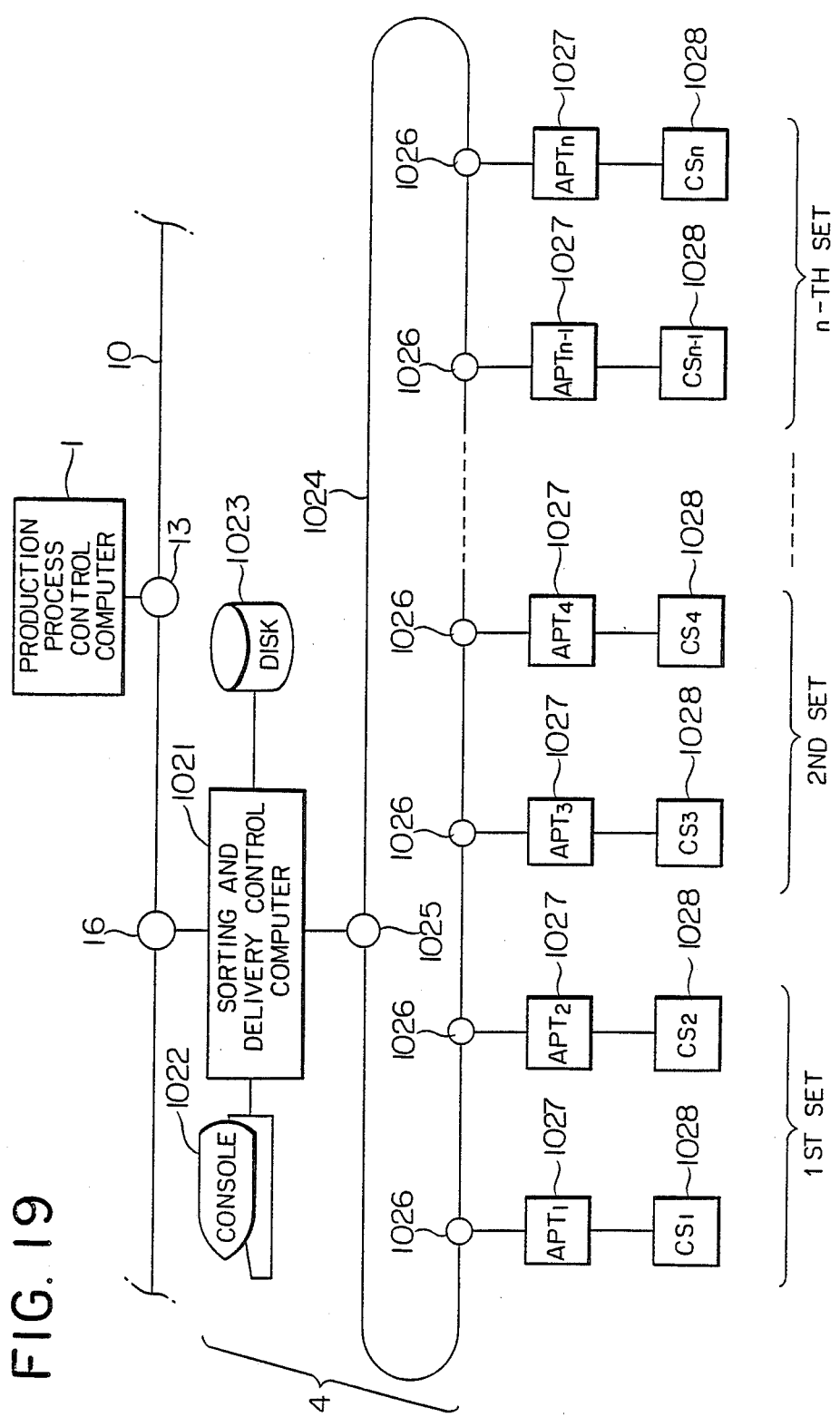
FIG. 19 is a diagram illustrating a sorting and delivery system embodying this invention.

FIG. 19 shows the construction of the sorting and delivery processing system embodying this invention. In the figure, numeral 1 refers to a production process control system; 4 to a sorting and delivery control subsystem; 10 to a data highway network; 13 to a master control station; 16 to an intelligent station; 1021 to a sorting and delivery control computer; 1022 to an operator console; 1023 to a magnetic disk; 1024 to a communication control bus composed of data highways; 1025 to a master station; 1026 to an intelligent station; 1027 to an address label printing/tagging device; and 1028 to a counter/stacker, respectively. The bundle dispatching master file is controlled on the side of the production process control system 1, while the bundle dispatching order file is prepared on the side of the production process control system 1, transmitted to the sorting and delivery control subsystem 4 via the network 1010, and stored in the disk 1023. The address printing master file is registered in the disk 1023, and related to the bundle dispatching order file. Instructions for the alteration or updating of the contents of character printing on address labels are given from the operator console 1022. Data communications are effected between the sorting and delivery control computer 1021 and each of the address label printing/tagging devices via the communication control bus 1024. The address label printing-/tagging device 1027 and the counter/stacker 1028 each incorporate microprocessors therein so as to enable data communications via the control bus.

As the bundle dispatching order file is transmitted from the production process control system 1, the address printing master file is related to the bundle dispatching file and the information on address printing and the number of copies per bundle is allocated to each address label printing/tagging device 1027 in the sorting and delivery control subsystem 4. In each address label printing/tagging device 1027, an instruction to prepare bundles consisting of predetermined number of copies is given to the corresponding counter/stacker 1028, and address labels are printed. The address label printing/tagging device 1027 has a font memory and a character enlarging function, prepares address image data on the basis of the address label printing information (coded information) provided by the sorting and delivery control computer 1021, and prints address labels. As newspaper bundles are prepared by the counter/stacker 1028, the address label printing/tagging device confirms the matching between the address labels and the corresponding bundles, and attaches the address labels to the bundles. Next, when the address label printing/tagging device 1027 asks the computer 1021 for an instruction to prepare bundles and address labels, the computer 1021 transmits the information on the address labels and the number of copies per bundle to the address label printing/tagging device 1027.

Figure 20:
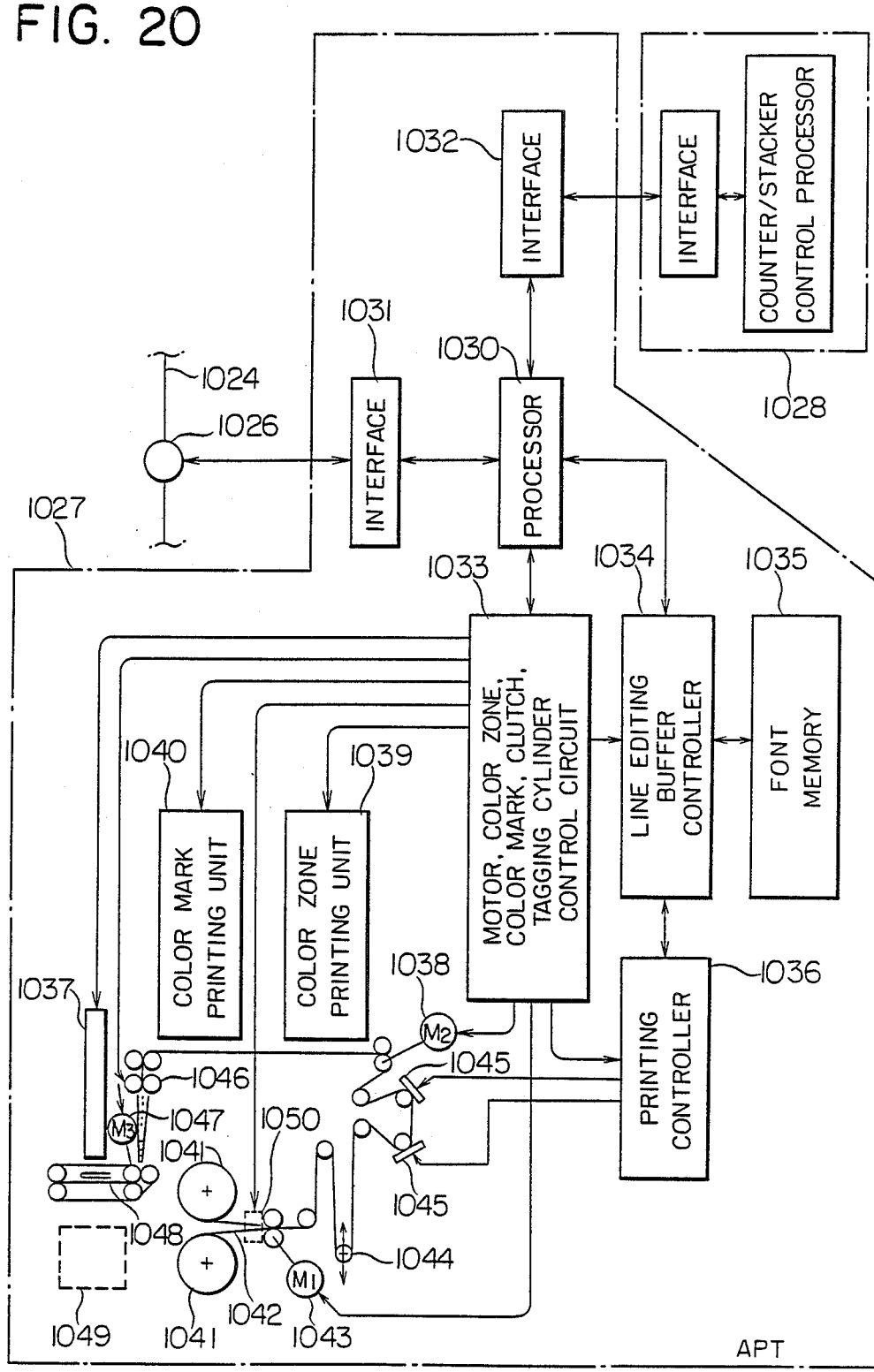
FIG. 20 shows the construction of an address label printing/tagging device embodying this invention.

FIG. 20 is a diagram illustrating the outlined construction of the address label printing/tagging device. In the figure, numeral 1024 refers to a communication control bus (FIG. 19); and 1026 to an intelligent station (FIG. 19); 1027 to an address label printing/tagging device; 1028 to a counter/stacker; 1031 to an interface connected to a processor 1030. Though not shown in the figure, the processor 1030 includes a memory; 1032 to an interface with the counter/stacker 1028; 1033 to a control circuit for controlling each portion of the address label printing/tagging device; 1034 to a line editing buffer controller for editing printing data; 1035 to a font memory; 1036 to a printing controller playing a role of transferring the edited printing data to the printing head; 1037 to an air cylinder for tagging address labels; 1038 to a pulse motor for feeding printing paper; 1039 to a color zone printing unit; 1040 to a color mark printing unit; 1041 to a newsprint roll; 1042 to a travelling paper web; 1043 to a drive motor for feeding paper web from a newsprint roll; 1044 to a dancer roller; 1045 to a printing head; 1046 to a rotary cutter for cutting printed address labels; 1047 to a motor for feeding the cut address labels to the tagging position; 1048 to an address label; and 1049 to a newspaper bundle, respectively. The address label printing data transmitted by the sorting and delivery control computer 1021 is stored in the memory of the processor 1030, and written in the line editing buffer under program control. The line editing buffer controller 1034 accesses the font memory 1035 based on the printing data (character code, multiplication factors for enlarging characters; printing position, etc.), and writes per-line character data in the line editing buffer based on printing position data and character enlarging multiplication factor data. Since the printing head 1045 is composed of multiple head, the necessary character data for each head 1045 is edited. The data is transferred to the printing controller 1036, and further to the printing head 1045. The timing of printing is generated based on an . instruction signal from the control circuit 1030 which takes charge of drive control. Since bundle data is also received as the address printing data, the data is fed to the counter/stacker 1028 via the interface 1032. The control timing of these functions is controlled by the processor 1030. The address label printing/tagging device 1027 is equipped with the paster device 1050 and constructed so as to permit address label printing to be performed continuously. The information on sorting bar code printing, color mark printing and color zone printing is also included in the address label printing data.

Figure 21:
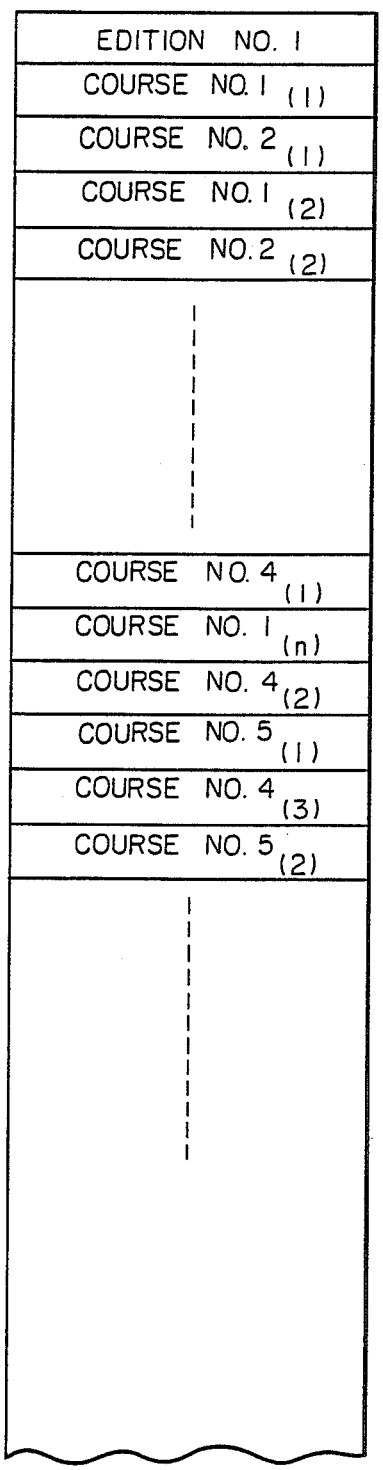
FIG. 21 is a diagram of assistance in explaining the sequence of newspaper bundling.

FIG. 21 shows the bundle dispatching order which is fed sequentially by the sorting and delivery control computer to each address label printing/tagging device. In the case shown in the figure, which bundle for which course will be prepared in which address label printing/tagging device is left undecided, unlike the case shown in FIG. 17. In the present invention, what has been decided in advance is only the order of bundle preparation. When the case shown in FIG. 21 is taken as an example, the order of bundle preparation is determined in the following fashion; that is, the bundle (1) for Course No. 1, the bundle (1) for Course No. 2, the bundle (2) for Course No. 1, the bundle (2) for Course No. 2, — the bundle (1) for Course No. 4, the bundle (n) for Course No. 1, the bundle (2) for Course No. 4 —. Once bundles are allocated to each address label printing/tagging device 1027 in that order, a bundle preparation end signal is fed to the computer 1021 (FIG. 19) by each address label printing/tagging device 1027. Then, the computer 1021 check the above order, and gives instructions for bundle preparation and address label printing to the address label printing/tagging device 1027. By adopting this method, newspaper production adjustment can be eliminated.

Figure 22:
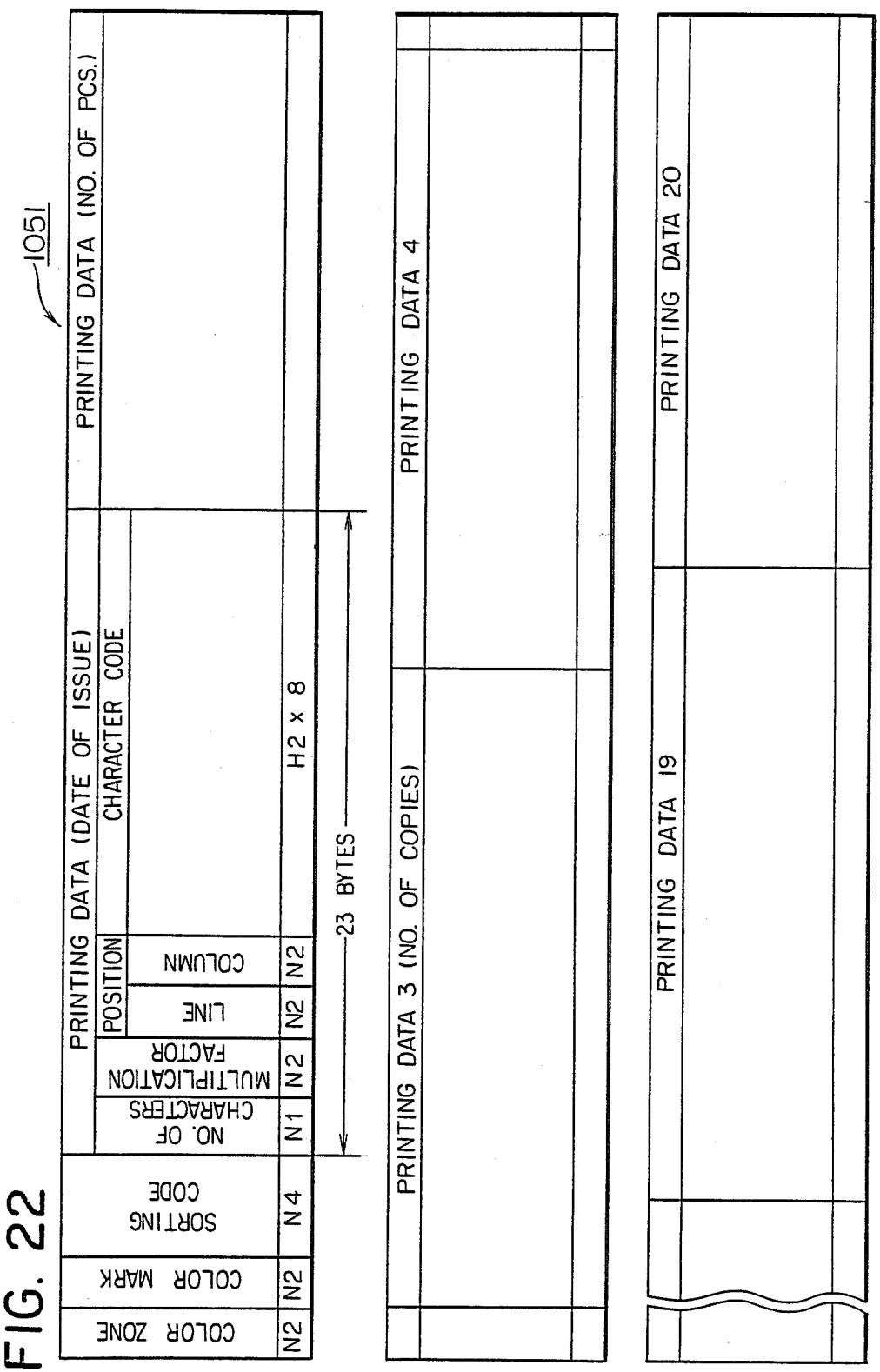
FIG. 22 shows an example of address printing data.

FIG. 22 shows an example of the format of address printing data. The address printing data consists of code information of less than 512 bytes, for example, as can be seen in the format 1051, and the address label printing/tagging device 1027 has the font memory 1035 so as to convert the information into an image to carry out address printing. "Printing data" in FIG. 22 corresponds with eight characters, max. per block.

FIG. 23 (A) shows the outline of the bundle dispatching order data file, which is broken down in terms of bundles. Against this file 1052, FIG. 23 (B) shows a folding unit index for designating the machines to be used (folding units $F_1$, $—F_n$, counter/stackers $CS_1$, $—CS_n$, address label printing/tagging devices $APT_1$, $—APT_n$). In the index 1053, when a single delivery flag is "1", the counter/stacker $CS_1$ and the address label printing/tagging device $PAT_1$ are used for the folding unit $F_1$, for example; and when the single delivery flag is "0", double delivery is effected, with the counter/stackers $CS_1$ and $CS_2$ and the address label printing/tagging devices $APT_1$ and $APT_2$ being used.

Additional description will be made in the following on the bundle dispatching order data file shown in FIG. 23 (A). The serial numbers shown in the figure correspond with bundles. And, for each serial number, (i) the data on the number of copies, (ii) the flag for bundle preparation end to indicate whether or not bundle preparation has been completed, (iii) the address printing data (code information) are described. The address printing data can be regarded as the same as the information having a format shown in FIG. 22 corresponding to one piece of address label.

Press Maintenance Control System

The press maintenance control system corresponds mainly with the materials and maintenance control subsystem 8 shown in FIG. 1.

Having a large number of consumable parts and different types of parts, the rotary press involves complex and troublesome parts control. Since newspaper production generally involves concentrated production in a short period of time, control of the maintenance of the rotary press is of critical importance. Under these circumstances, much labor has to be expended to ensure the control of rotary press maintenance.

The press maintenance control system embodying this invention is intended to overcome these problems. In the press maintenance control system, the cumulative totals of machine operating time, the frequency of operations and the number of copies printed are grasped by inputting into the computer press start/stop signals, main drive shaft revolution pulse signals, brush roller revolution pulse signals, paster operation signals, slitter ON/OFF signals, and dampening water pH detection signals; the residual life is calculated by deducting the cumulative totals obtained from the life expectancy (expressed in terms of time, the frequency of operations and the number of copies) that has been input in advance; and the date of parts replacement is calculated by knowing the durable life of parts by dividing the operating time; the frequency of operations and the number of copies for an average day by the residual life obtained above.

The schedule of inspection work, that is, how many formed is calculated from the degree of importance of each part, and the operating rate, the frequency of operations and the ratio of mechanical strength obtained from statistical data, and input into the computer so that maintenance personnel can refer to the schedule from time to time by outputting the data on the display unit or in the form of printout.

Figure 24:
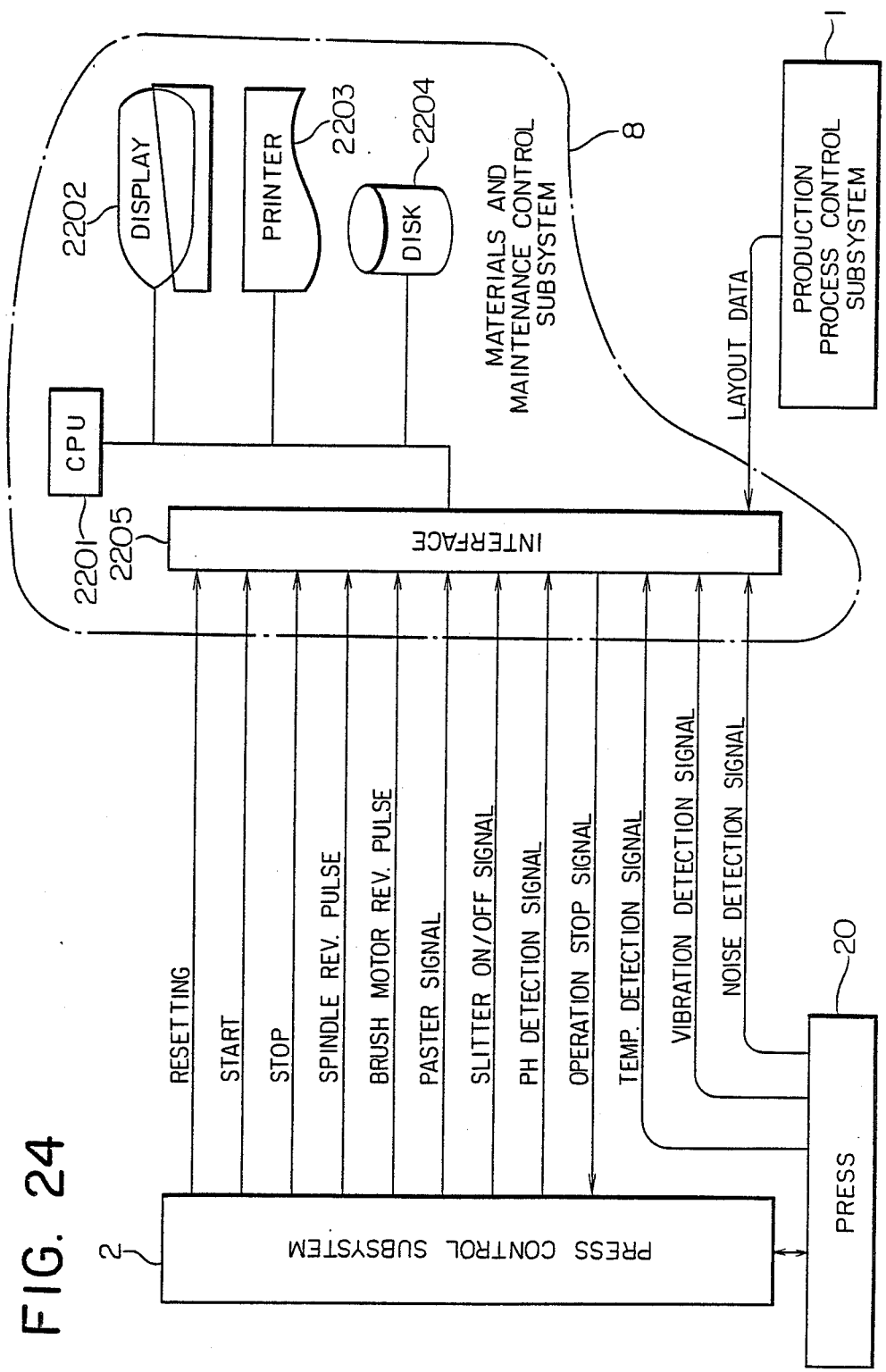
FIG. 24 is a diagram illustrating a press maintenance control system.

FIG. 24 shows the construction of the press maintenance control system. In the figure, numeral 1 refers to a production process control system; 2 to a press control subsystem for controlling the operating state of the rotary press; 20 to a press; 2201 to a maintenance control computer; 2202 to a display; 2203 to a printer; 2204 to a disk memory sorting the information on materials management and maintenance control; and 2205 to an interface, respectively.

The service life of a material or a part used for printing may usually be expressed in the function of the number of copies printed, or the function of the frequency of printing operations, or the function of the printing press operating time, or the function of a combination of two or three of the number of copies printed, the frequency of printing operations and the printing press operating time. In the press maintenance control system embodying this invention, therefore, the information necessary to predict the service life of a part is supplied from the press 20 and the press control subsystem 2, and controlled by the maintenance control computer 2201.

The reset signal, start signal, stop signal, main drive shaft revolution pulse signal, brush roller revolution pulse signal, paster signal, slitter ON/OFF signal, pH detection signal relating to the rotary press 20 are supplied from the press control subsystem 2. Since operation timing and operating time are different for different parts with the operating sequence of the press 20, it is necessary to keep records of the actual operation of the press by collecting these signals.

Furthermore, the vibration detection signal, temperature detection signal, and noise detection signal for the press 20 are supplied so that the operation of the press 20 can be stopped in advance based on these signals to prevent an abnormality of the press 20 from further aggravating, or a warning signal can be issued on the display 2202 or the printer 2203 to inform of the press requiring maintenance. This system can detect an abnormal rise in the bearing temperature of the plate cylinder, preventing the bearing from seizing and allowing the repair to be performed during normal maintenance operations.

The information on the number of printing units to be used, the plate cylinder in the printing unit to be used, printing plate mounting positions, the number of folding unit, the number of slitter to be used, the number of compensator roll to be used, the number of cut-off roll to be used is encoded and transmitted from the production process control system 1 shown in the figure to the maintenance control processor 2201. The information is used as the data for selecting parts to be used and parts not to be used according to pagination and web leading. In the figure, a set of rotary press 20 is shown, but it is needless to say that, in actual practice, several or several dozens of presses are used, and the corresponding number of interfaces 2205 are used accordingly.

Figure 25:
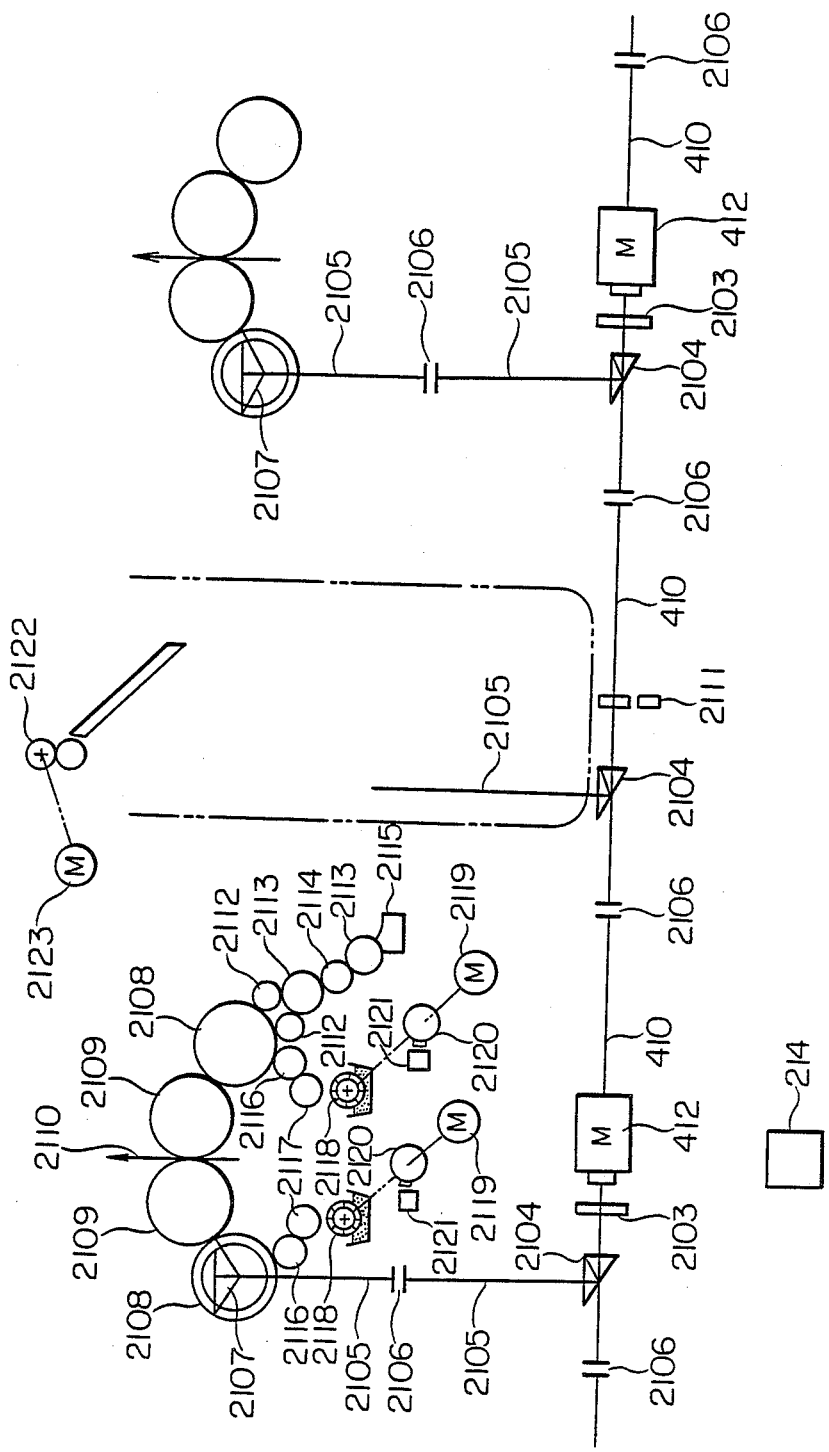
FIG. 25 is a diagram illustrating the outline of part of an offset rotary press.

FIG. 25 shows the outlined construction of part of the offset rotary press and the essential part of the construction shown in FIG. 15. In the figure, numeral 410 refers to a main drive shaft; 412 to a main motor; 2103 to a brake; 2104 to a gear for driving the vertical shaft; 2105 to a vertical shaft; 2106 to a clutch; 2107 to a gear for driving the printing cylinder; 2108 to a printing cylinder; 2109 to a blanket cylinder; 2110 to a travelling paper web; 2111 to a proximity switch for detecting the revolution of the main drive shaft 410; 2112 to an ink form roller; 2113 to an ink cylinder; 2114 to a transfer roller; 2115 to an ink rail; 2116 to a dampening form roller; 2117 to a chrome roller; 2118 to a brush roller; 2119 to a brush driving roller; 2120 to a target piece for proximity switch mounted on the brush drive shaft; 2121 to a proximity switch for detecting the revolution of the brush roller; 2122 to a slitter; 2123 to a motor for driving the slitter; and 2124 to an oil pump, respectively.

The number of copies printed is determined by the revolution of the main drive shaft 410. Those parts whose service lives can be expressed by the number of copies printed include a blanket wound on the blanket cylinder 2109, the ink form roller 2112 and the transfer roller 2114. Those parts whose service lives can be expressed by the frequency of operations include the brake 2103, the brush roller 2118 and the brush drive motor 2119. Those parts whose service lives can be expressed by operating time include the slitter 2122. Furthermore, those parts whose service lives can be expressed a combination of multiple factors include oil and grease, whose service lives can be expressed by the frequency of operations and operating time.

These three types of factors can be used to determine the service life of each part.

FIG. 26 shows the construction of a parts file embodying this invention. The parts file 2210 is formed in the disk memory 2204 shown in FIG. 24, and used for the maintenance control of parts. That is, the life expectancy of each parts is given, and the frequency of operations is counted from the various received information shown in FIG. 24 to calculate the cumulative frequency and the residual life and to update the contents of the file 2210.

FIG. 27 shows the construction of a parts inventory file embodying this invention. The parts inventory file is also formed in the disk memory 2204 shown in FIG. 24, and is used for the inventory control of parts. That is, the stock volume of each part is counted, and the date of order for each part is recorded in the file 2220.

The contents of the files 2210 and 2220 are updated in accordance with the operating state of presses, and output as necessary on the display unit or by the printer. When an abnormal condition of a press is detected, warning is given to the operator.

Newsprint Roll Supply System

The newsprint roll supply system corresponds mainly with the newsprint roll storage control subsystem 6 shown in FIG. 1.

To begin with, operations of the feeding unit of the rotary press will be described in the following.

(1) The quantity and size of newsprint rolls, and product names are given to the manufacturer in advance when placing orders for newsprint rolls.
(2) The paper manufacturer delivers the ordered products to the newsprint roll warehouse of the printing factory.
(3) The operator arranges and stores the delivered newsprint rolls by quantity, product name and size. The mill wrappers of the rolls required for printing on the current day are removed.
(4) The newsprint rolls stripped of mill wrappers are transported to the press feeding unit by means of the transport conveyor.
(5) The operator in charge of each feeding unit selects a newsprint roll of the required size from among the rolls that are circulated around the presses, takes the roll into the feeding unit after turning the roll 180 degree, if the roll is arranged in the opposite direction, and mount the roll on the three arm reel.
(6) An adhesive layer for pasting is applied onto the ends of the roll.
(7) After paper webs are automatically pasted, the residual paper core is placed on a carriage to recover by means of the circulating transport conveyor.

The abovementioned processes have heretofore required considerable labor and time because the processes involve inefficient manual operations in handling heavy newsprint rolls. Furthermore, there are often the cases where rolls of the required size are not on the circulating transport conveyor during printing and new rolls have to be transported from the warehouse, resulting in adverse effects in the progress of printing operation.

In the newsprint roll supply system, this problem has been overcome by controlling the receipt and delivery of newsprint rolls in the newsprint warehouse by quantity and size, automatically removing mill wrappers on the newsprint rolls being used, automatically mounting the next roll on the three arm reel as needed for automatic pasting to be performed in each feeding unit, and automatically recovering used paper cores.

Figure 28:
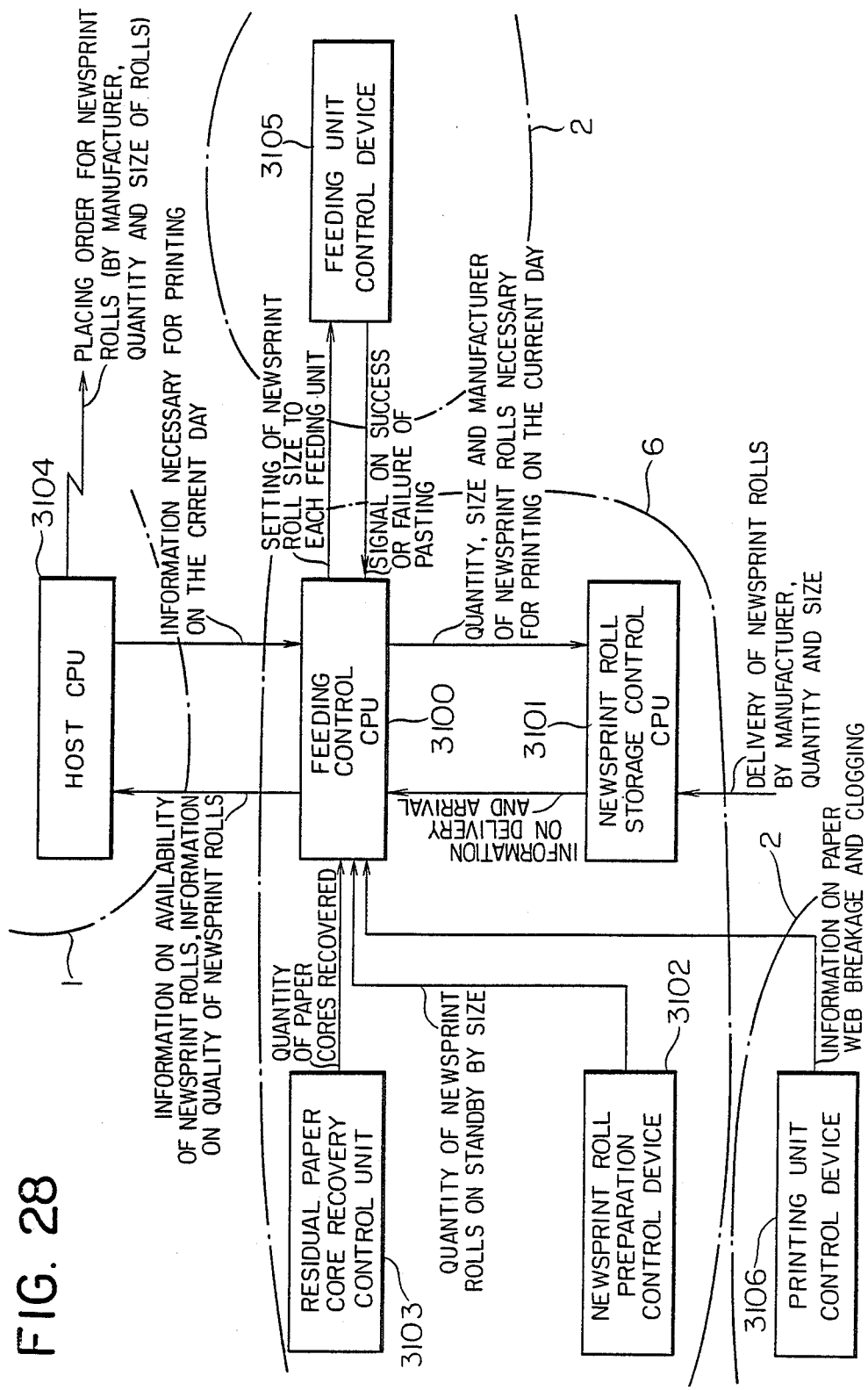
FIG. 28 is a diagram illustrating a newspring roll supply system.

FIG. 28 shows the construction of the newsprint roll supply system. In the figure, numeral 1 refers to a production process control system for controlling the entire system; 2 to a press control subsystem for controlling press operations, including printing operation; 6 to a newsprint roll storage control subsystem for controlling the transportation of newsprint rolls from the warehouse to the newsprint roll storage, and the transportation of newsprint rolls to the feeding unit of the press; 3100 to a newspring roll feeding control processor for controlling the entire newsprint roll feeding operations on the basis of the information given by the host processor 3104; 3101 to a newsprint roll storage control processor for controlling the newsprint roll warehouse; 3102 to a newsprint roll preparation control device for pretreating the newsprint rolls for pasting, and putting the newsprint rolls on standby; 3103 to a residual paper core recovery control device for controlling the recovery of residual paper cores after the rolls are supplied to the press feeding unit; 3105 to a newsprint roll feeding unit control device belonging to the press control subsystem, and 3106 to a printing unit control subsystem, respectively.

As the information required for printing on a given day is transmitted from the host processor 3104, the newsprint roll feeding control processor 3100 sets the quantity and size of newsprint rolls required for printing operation to the feeding unit control device 3105, and controls the supply of newsprint rolls to the press in accordance with the results of pasting processing from the newsprint roll feeding unit control device 3105.

The newsprint roll storage control processor 3101 controls the newsprint rolls delivered by the manufacturer, and controls the transport of newsprint rolls to the newsprint roll preparation floor from the warehouse in accordance with the instruction given by the newsprint roll feeding control processor 3100. The newsprint roll preparation control device 3102 puts on standby the newsprint rolls transported to the newsprint roll preparation floor where the rolls are subjected to pretreatment for pasting.

The residual paper core recovery control device 3103 controls the automatic recovery of residual paper cores of the newsprint rolls supplied to the press. The newsprint roll feeding control processor 3100 controls the entire newsprint roll feeding operations, as mentioned above.

Figure 29A:
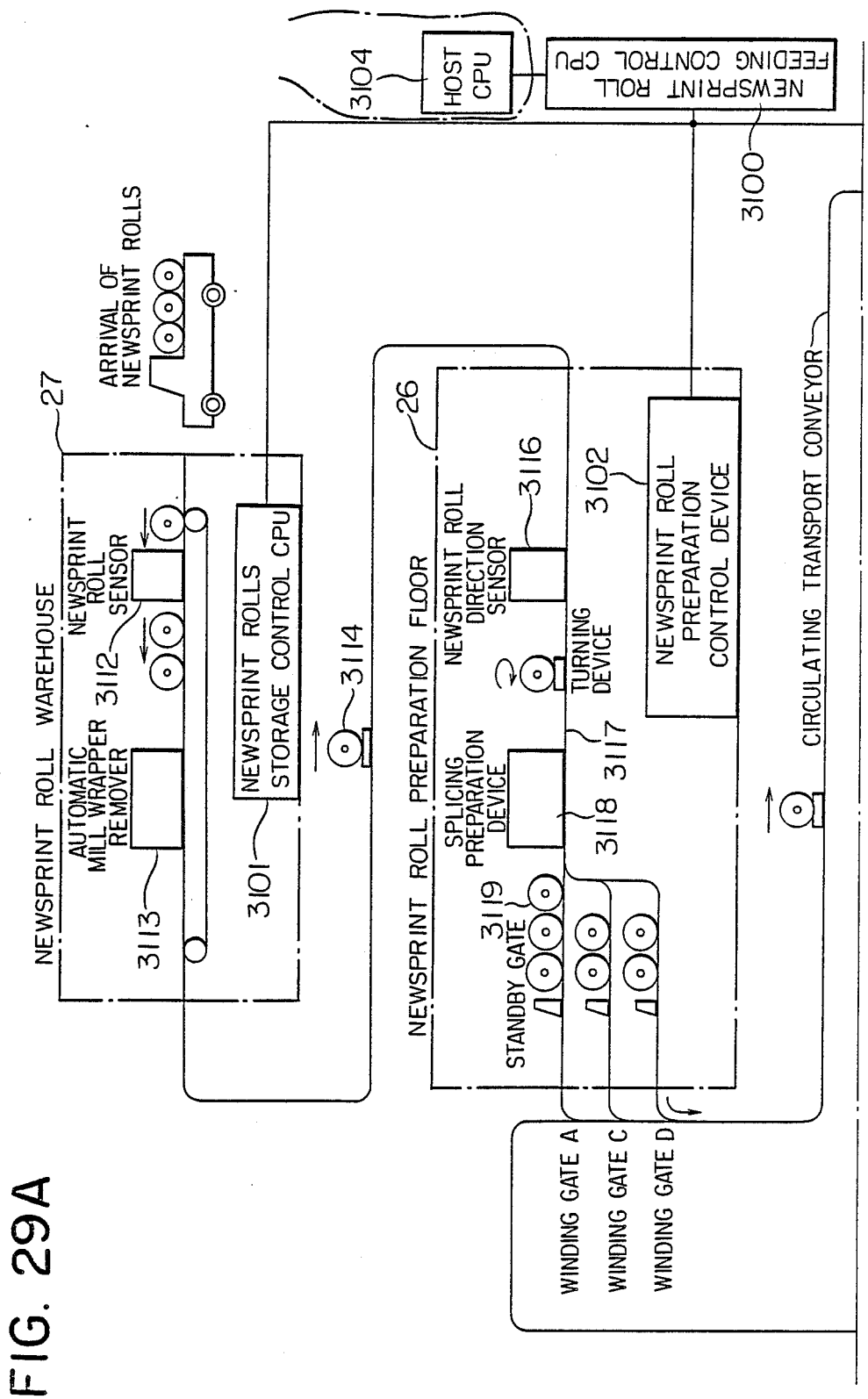

FIG. 29 shows the essential part of the embodiment shown in FIG. 28. In the figure, numerals 3100, 3101, 3102, 3103, 3104, 3105 and 3106 correspond with like parts in FIG. 28.

The host processor 3104 transmits the information necessary for printing on the current day, that is, the information on the total number of copies to be printed, the number of pages to be printed, the number of printing units to be used, the plate layout to be allocated to each printing unit to the newsprint roll feeding control processor 3100. The newsprint roll feeding control processor 3100 determines the quantity and size (A, C, D, for example) of the newsprint rolls required for printing on the current day, and transmits the data to each feeding unit control device 3105 (FIG. 28).

While newsprint rolls that have been ordered are delivered to the newsprint roll warehouse 27 through the roll receiving entrance, the size and quantity of newsprint rolls are checked by the newsprint roll sensor 3112, which also reads product numbers encoded on the rolls. (These product numbers may be input by the operator who receives the rolls.) This newsprint roll receiving information is input into the newsprint roll storage control processor 3101. The delivered newsprint rolls are transported by the transport conveyor and classified by product number and size for stock in the warehouse.

The newsprint roll storage control processor 3101 stores the data on the storage sites of newsprint rolls by product number, size and quantity to control the stock of newsprint rolls. As the information on the total number, size and product number of newsprint rolls required for printing operation on the current dry is transmitted from the newsprint roll feeding control processor 3100, newsprint rolls stocked are transported in accordance with the information by the transport conveyor to the automatic mill wrapper removal device 3113 where protective films covering both sides in the axial direction and in the circumferential direction of newsprint rolls are removed. The newsprint rolls stripped of protective films are placed on the conveyor 3114 which automatically transports the rolls from the delivery gate.

The newsprint roll placed on the conveyor 3114 enters the newsprint roll preparation floor 26. The roll winding direction sensor 3116 detects the direction of an arrow mark printed on the side of the roll. The roll then enters the turning device where the roll winding direction, if reversed, is corrected by turning the roll 180 degree. This means that all the rolls clearing the turning device 3117 are oriented in the correct direction.

Next, the newsprint roll is transported to the pasting preparation device (paster preparation device) 3118 where the ends of a newsprint roll are prepared into a shape suitable for pasting and covered with an adhesive layer for pasting. Upon completion of adhesive application, the roll is sent to the standby gate 3119 for stock by size.

If a newsprint roll being pasted is not mounted on the three arm reel of the press feeding unit, or if the next roll is asked after pasting operation, a newsprint roll of the corresponding size is transported from the standby gate 3119 on the newsprint roll preparation floor 26. Since the number of the three arm reel on which the roll is to be mounted is already known, the roll which must be turned 180 degree can be known by the three arm reel number. Such reels are mounted on the press feeding unit after turned 180 degree in the turning device 31.

The residual paper cores of used newsprint rolls are transferred on the automatic transfer car 3121 and transported to the residual paper core recovery yard 3122. Signals for the success or failure of pasting, or signals for web breakage or web clogging, are transmitted to the newsprint roll feeding control processor 3100 to collect the information on the quality of newsprint rolls by product and size.

Figure 30:
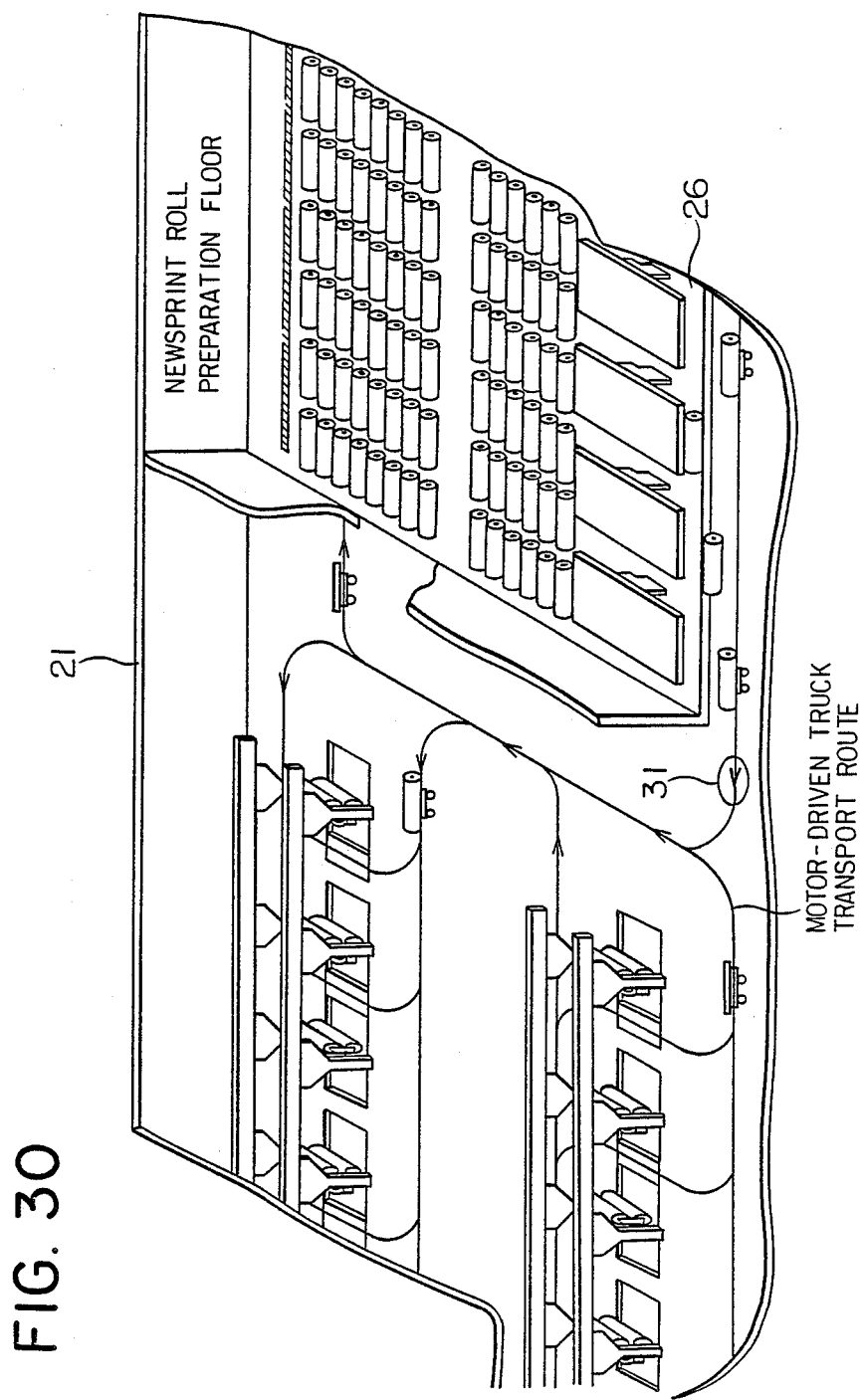
FIG. 30 shows the construction of essential parts centering around the newsprint roll preparation floor.

The construction of the newsprint roll warehouse and the newsprint roll preparation floor of the newsprint roll storage, both of which are to be controlled by the newsprint roll storage control subsystem, is shown in FIG. 5 above. In the figure, numerals 21, 26, 27 and 31 correspond with like parts in FIG. 29. FIG. 30 is a perspective view illustrating the newsprint roll preparation floor and the press feeding unit.

What is claimed is:

1. A production process control system for a news printing system using rotary presses comprising:
   (a) a press control subsystem means for controlling the presses;
   (b) a subsystem means for controlling sorting and delivery;
   (c) at least one of:
      (i) a subsystem means for controlling printing plate transportation,
      (ii) a subsystem means for controlling newsprint storage,
      (iii) a subsystem means for controlling mailroom materials supply, and
      (iv) a subsystem means for controlling truck yard bundle sorting,
   (d) a production process control subsystem means for supervising and controlling each said subsystem means;
   (e) each subsystem means comprising a station and each station comprising an intelligent input/output processor unit;
   (f) a ring-like data highway means for connecting each station to the other stations;
   (g) a circulation control subsystem means for controlling newspaper sales business processing; and
   (h) connecting means for connecting the circulation process control subsystem means directly to the production process control subsystem means.

2. A production process control system according to claim 1, further comprising:
   a plurality of printing units having plate cylinders;
   plate processing means for processing desired printing plates;
   printing plate transport carrier means for transporting processed printing plates to said printing units;
   printing plate mounting robot means associated with each of said printing units for mounting printing plates on printing plate cylinders of said printing units;
   said production process control system including file preparation means for preparing a printing plate layout data file including data on printing unit numbers, plate cylinder numbers, plate mounting positions on said plate cylinders and page numbers and for transmitting the printing plate layout data file to the printing plate transportation control subsystem;
   said printing plate transportation control subsystem including means for receiving said printing plate layout data file, for receiving the page numbers of plates sequentially processed by said plate processing means, for searching the printing plate layout data file for each printing plate process by said plate processing means and for outputting the destination of each printing plate processed by said plate processing means to said printing plate transport carrier for transportation of printed plates to their respective destinations.

3. A production process control system according to claim 1, wherein said sorting and delivery control system includes:
   counter/stacker means for receiving data on the number of copies per bundle and bundle serial number and for preparing newspapers bundles based on received data; and
   address label printing/tagging device means for receiving data on bundle serial number and attaching an address label at an attaching position on said newspaper bundles prepared by said counter/stacker means.

4. A production process control system according to claim 1, further comprising materials and maintenance control system means connected with said production process control system by said connecting means, said materials and maintenance control system for controlling materials of the news printing system and controlling maintenance of elements of the news printing system.

5. A process control system according to claim 4, wherein said materials and maintenance control subsystem includes press maintenance control means having a maintenance control processor for receiving a plurality of signals including press start/stop signals, press main drive shaft revolution pulse signals, brush roller revolution pulse signals, paster operating signals, and slitter on/off signals from said production process control subsystem means and for receiving temperature sensing signals, vibration sensing signals and noise sensing signals from said press control subsystem means and for collecting information on press operation, controls, based on received signals and for outputting information including residual service life of parts information, information on the number of copies printed, operating time and operating frequency information and parts maintenance information.

6. A process control system according to claim 1, wherein said circulation control subsystem means comprises means for receiving newspapers samples information and for outputting number of copies information to said production process control system means via said connecting means.

7. A process control system according to claim 1 wherein said subsystem means for controlling newsprint storage includes a newsprint roll controller processor for receiving total volume of newsprint roll consumed by a plurality of newsprint feeding units associated with a plurality of rotary presses information, the size of newsprint rolls consumed by the feeding units information, said feeding control processor selecting the required size and number of newsprint rolls for a newsprint roll warehouse; a newsprint roll preparation control device for re-arranging newsprint rolls taken out of the newsprint roll warehouse, said feeding control processor controlling the transportation of newsprint rolls to a press unit.

* * * * *